Oct. 15, 1968   V. R. CARPENTER ET AL   3,405,853
PANTS PRESS
Filed Dec. 27, 1966   10 Sheets-Sheet 8
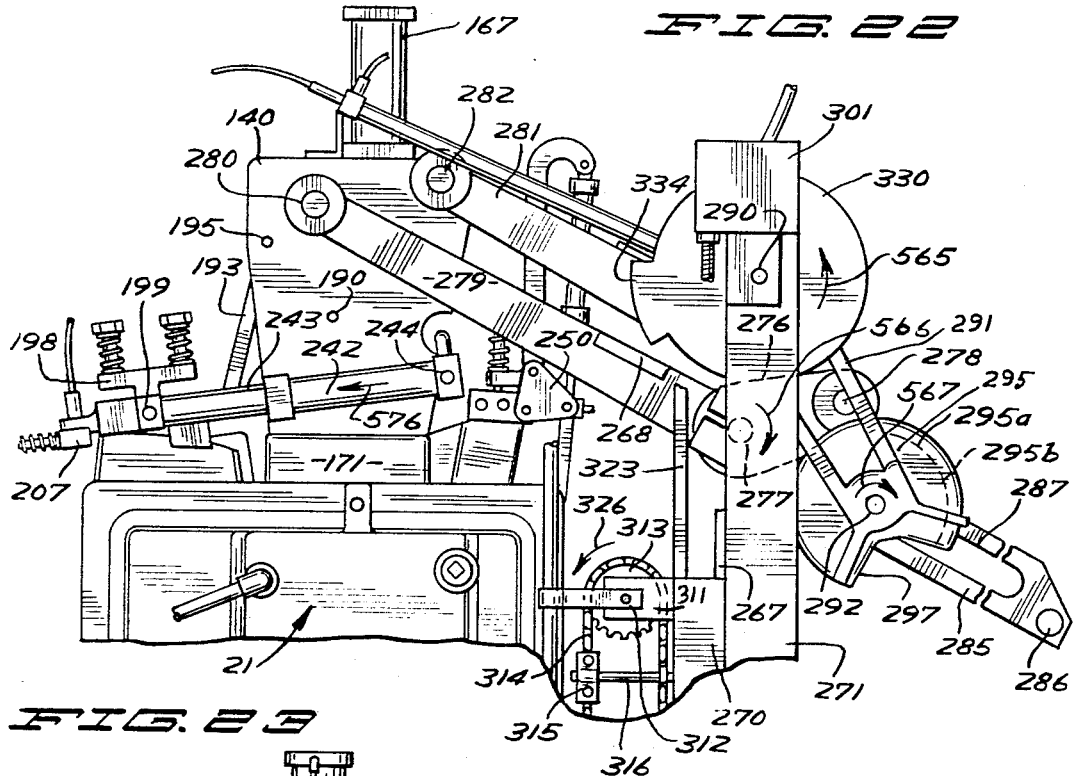
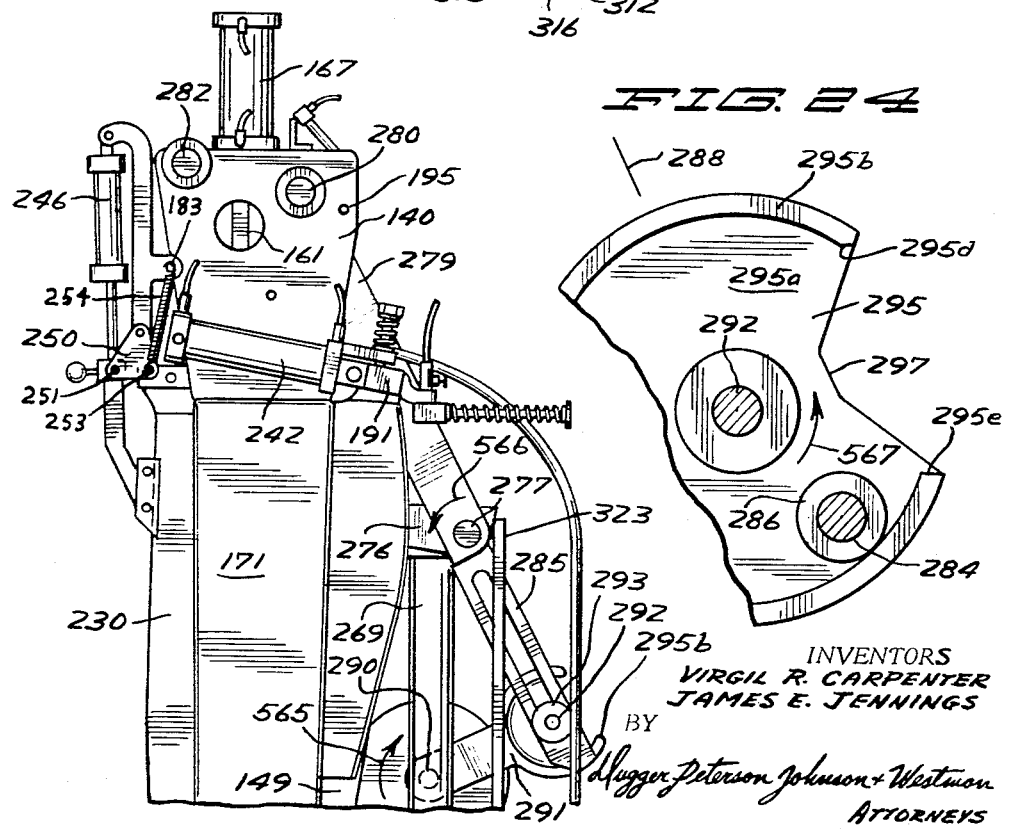
INVENTORS
VIRGIL R. CARPENTER
JAMES E. JENNINGS
BY
*Dugger, Peterson, Johnson & Westman*
ATTORNEYS

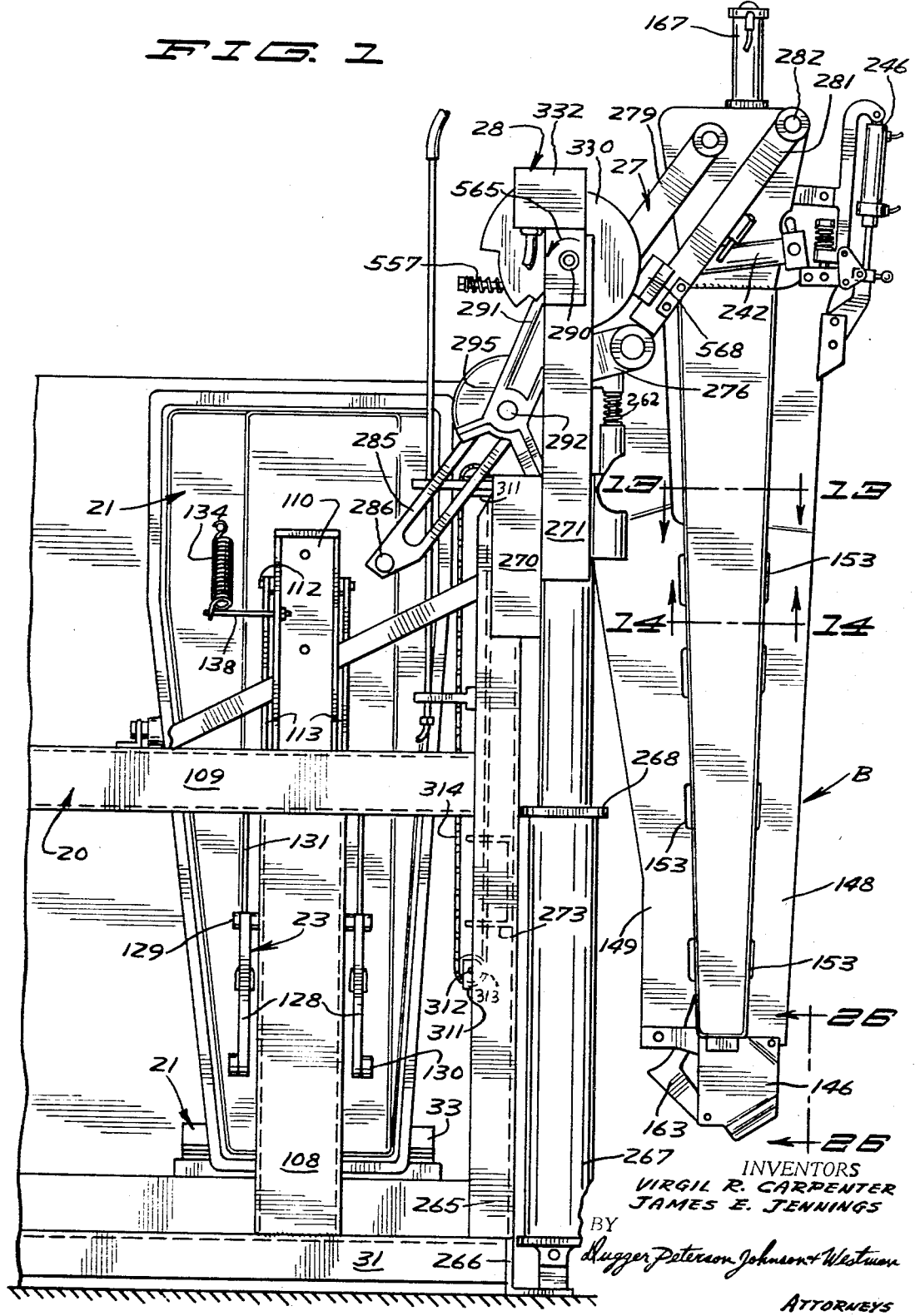

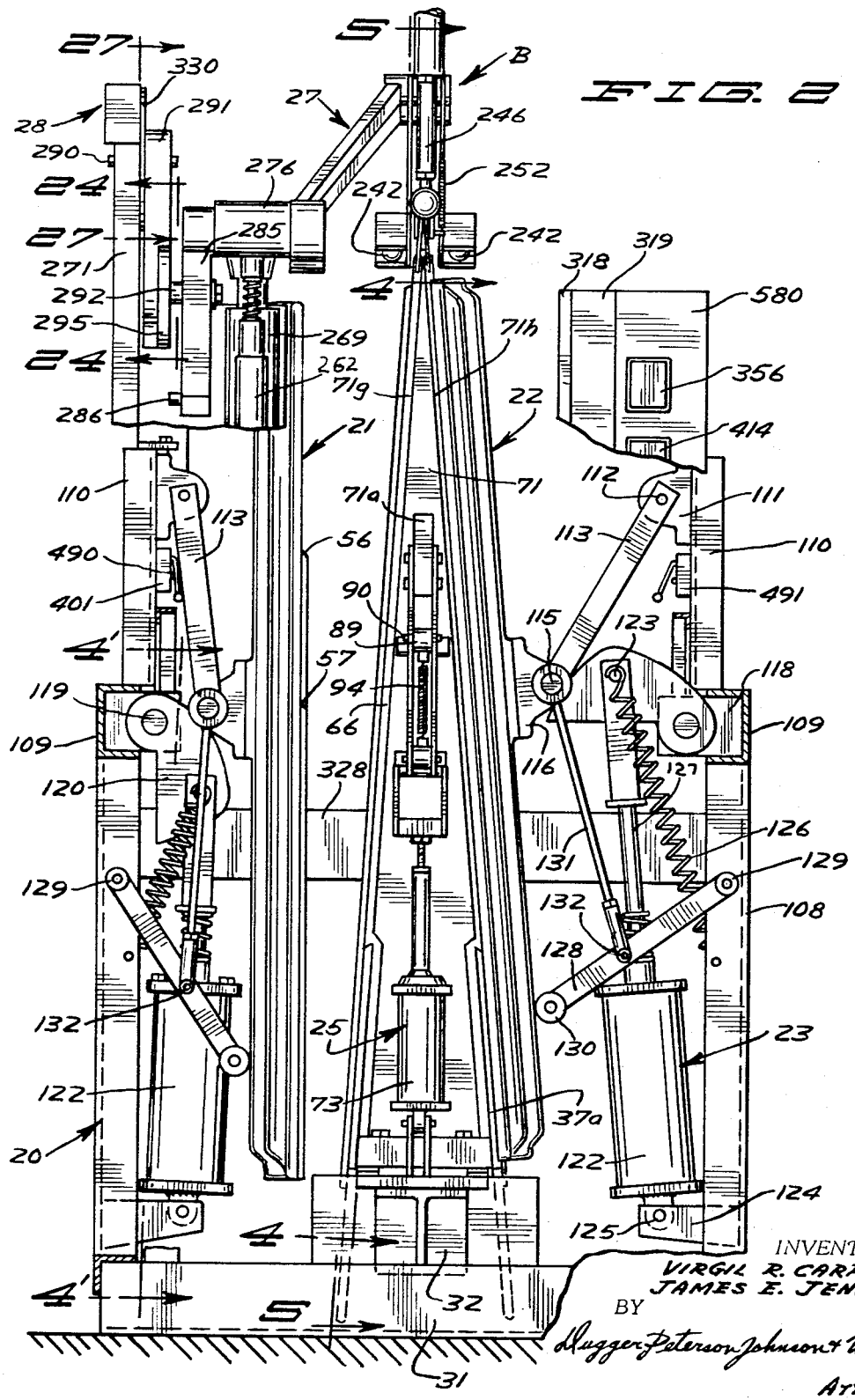

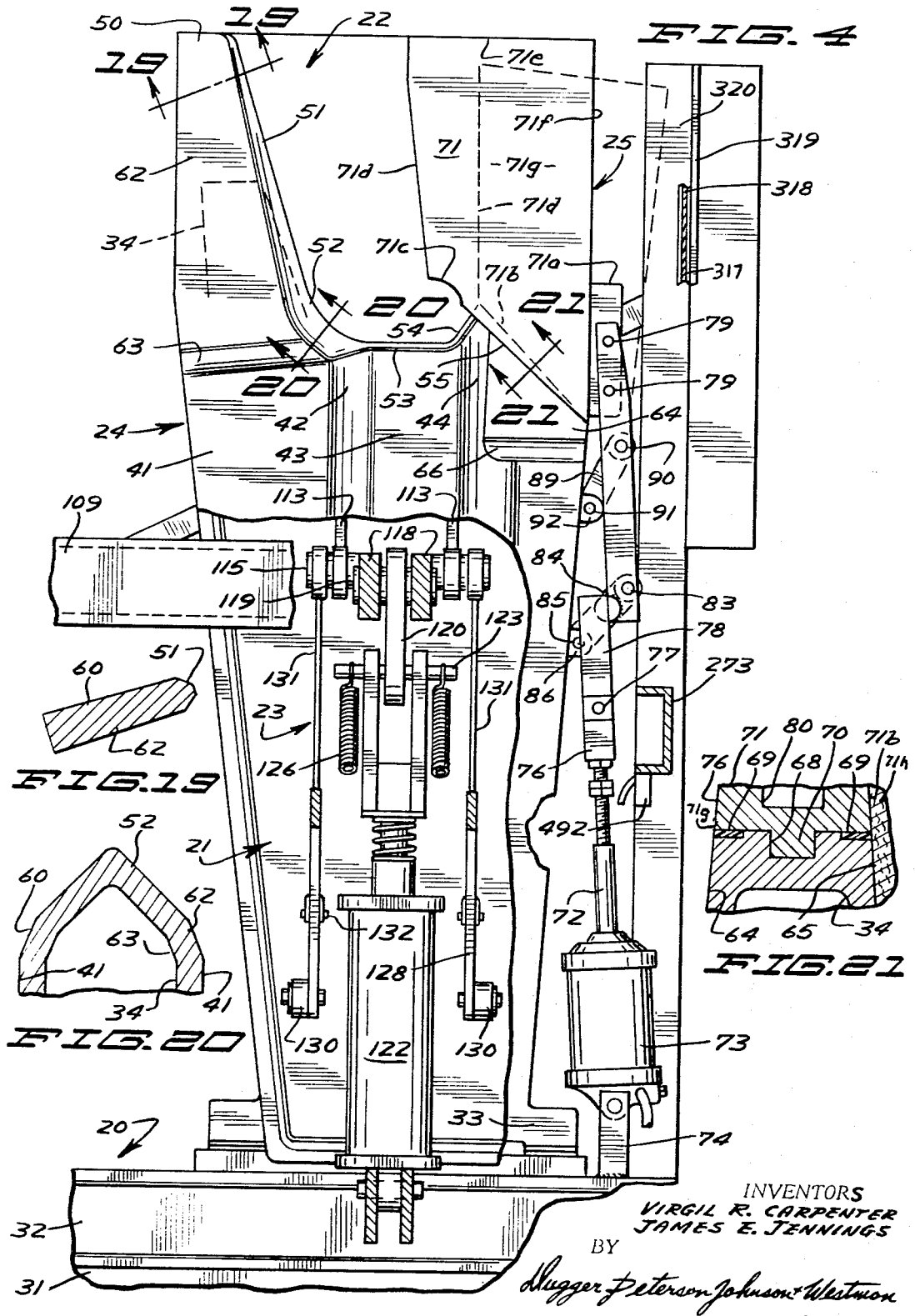

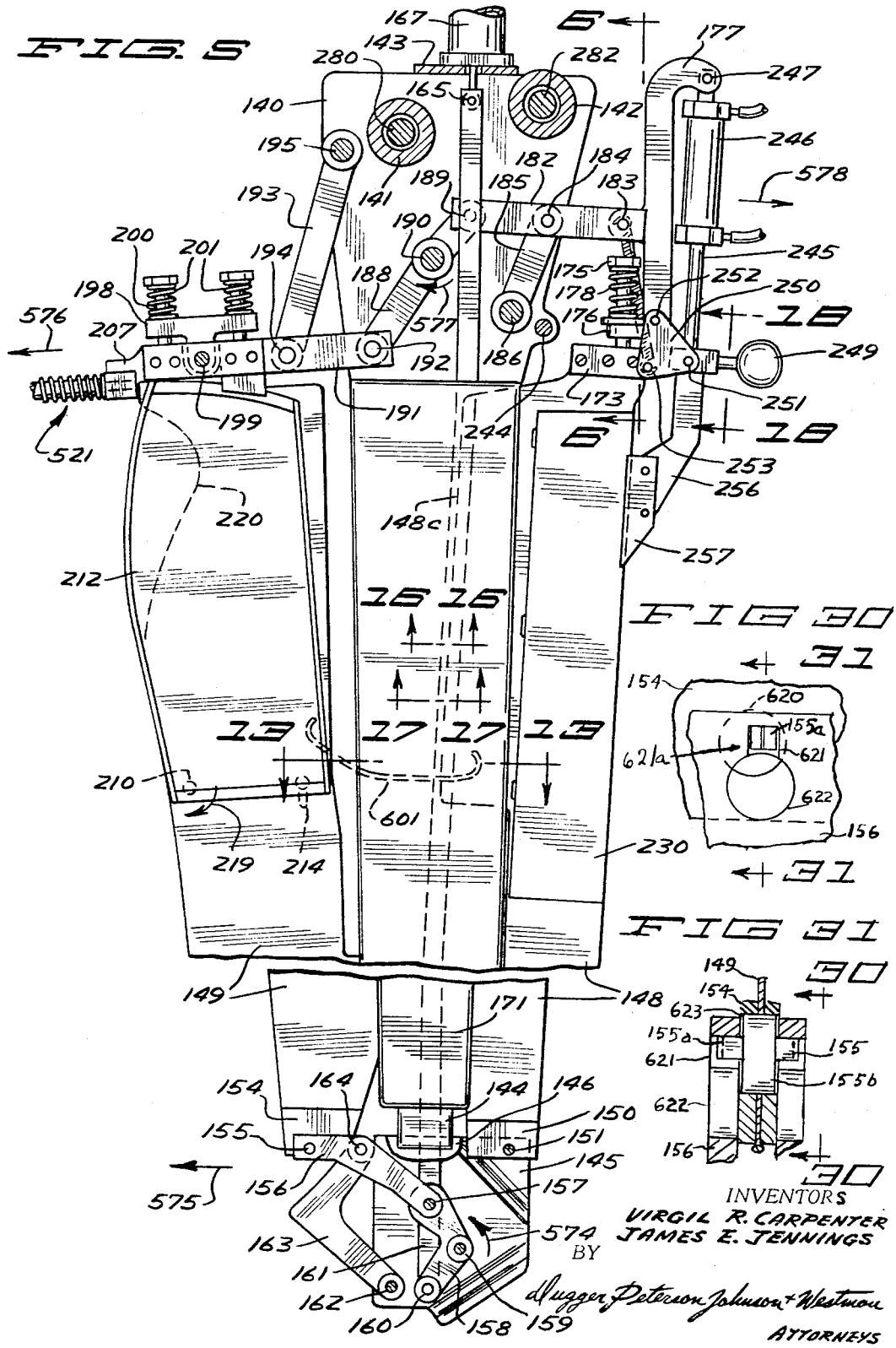

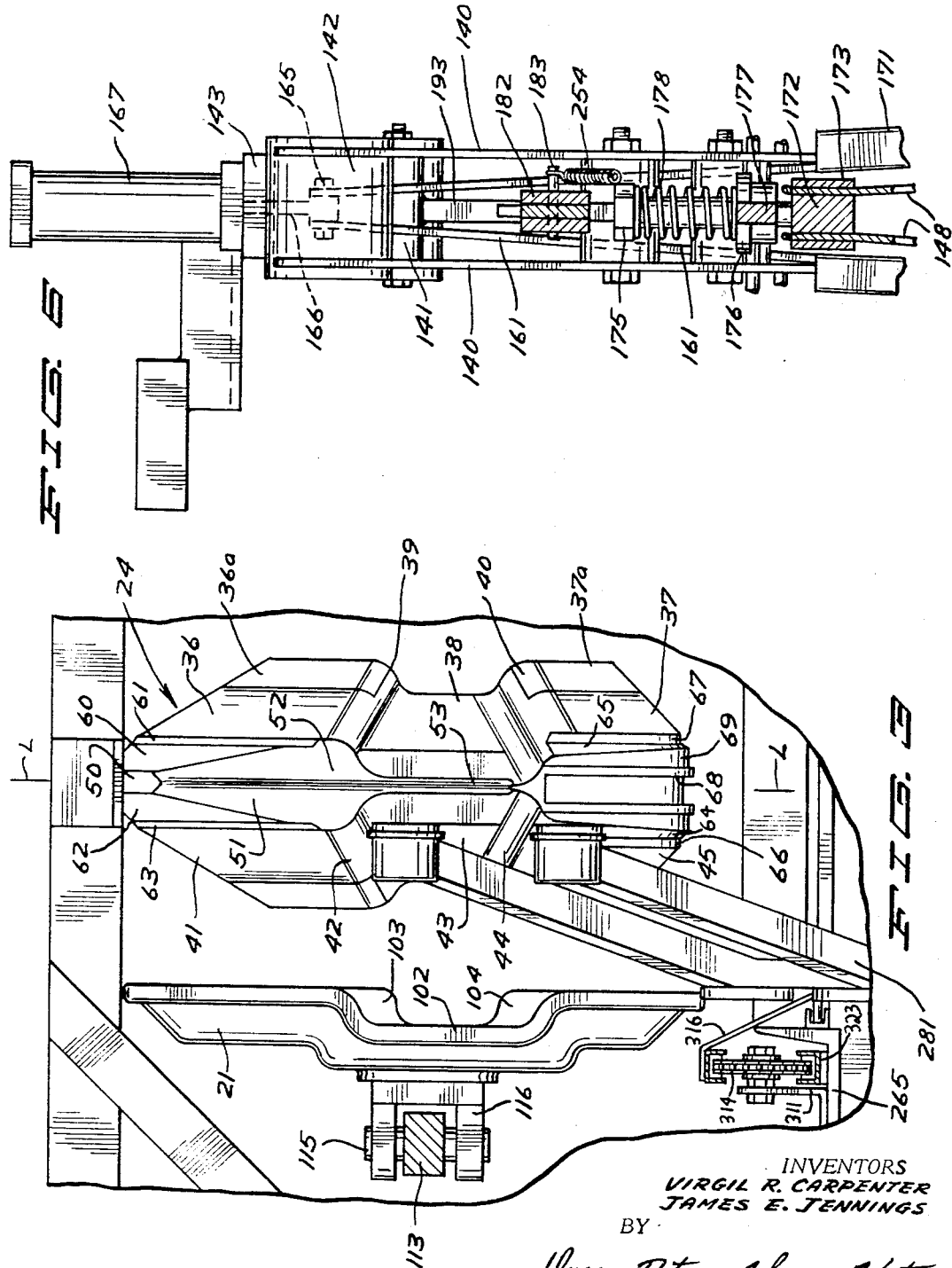

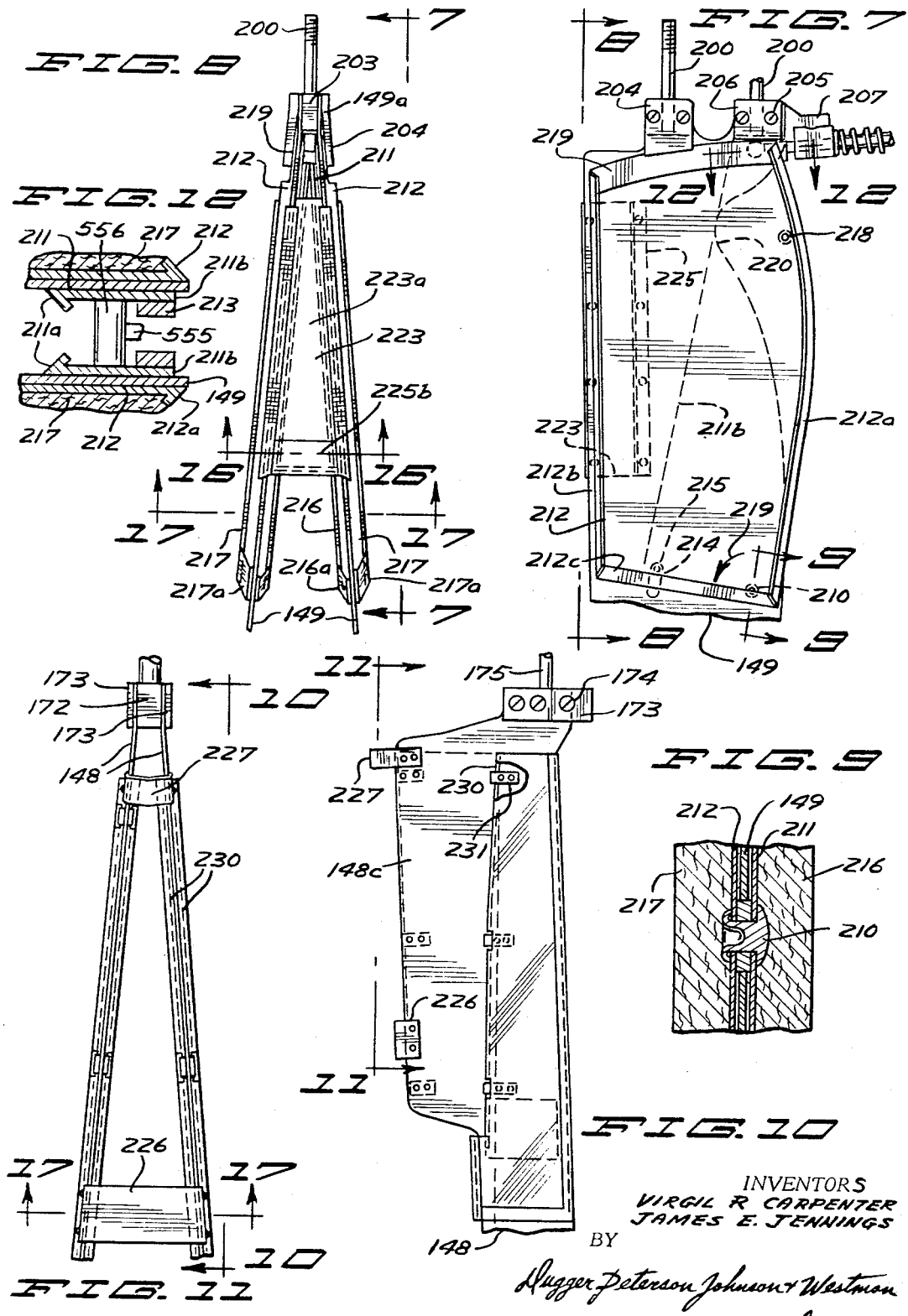

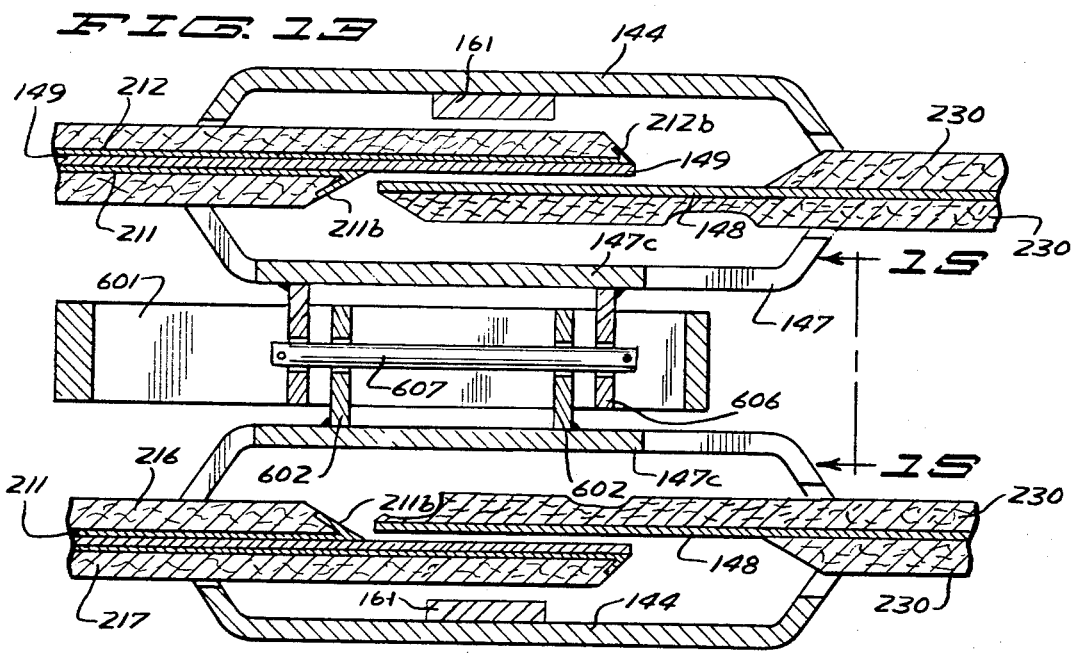
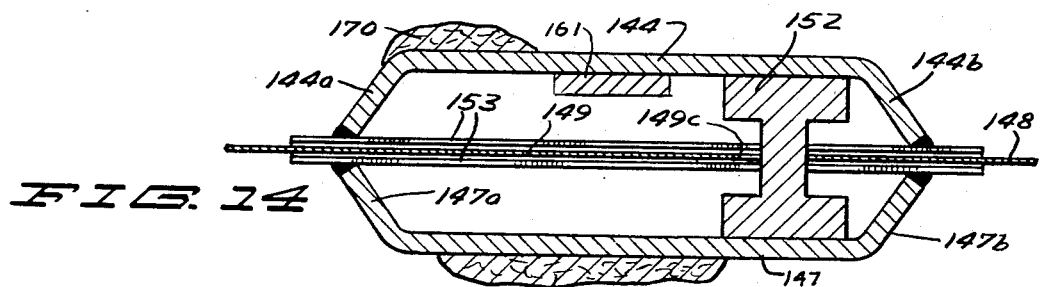
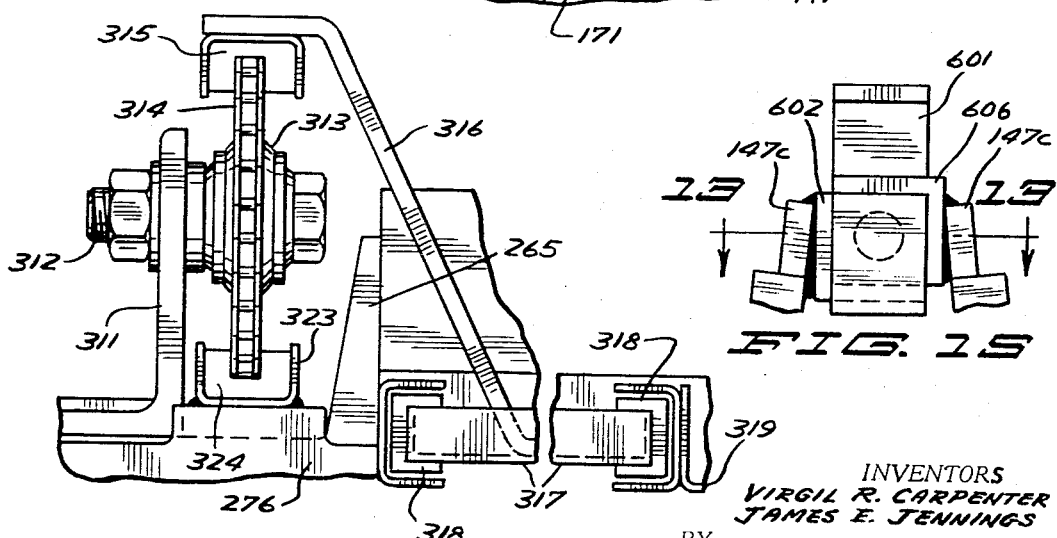

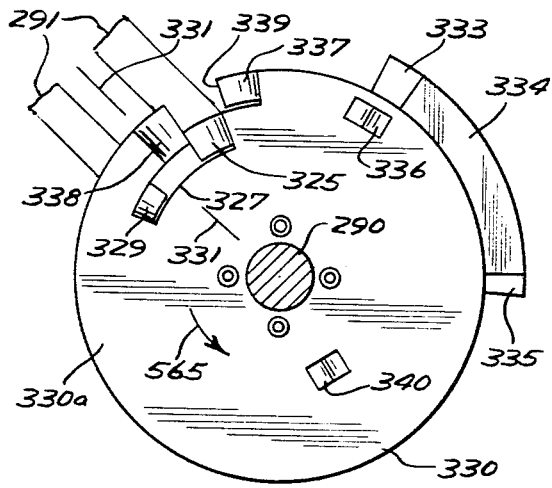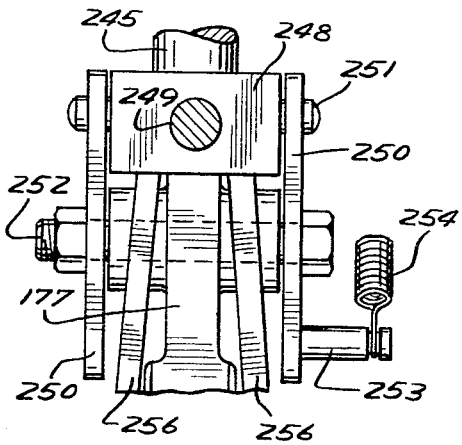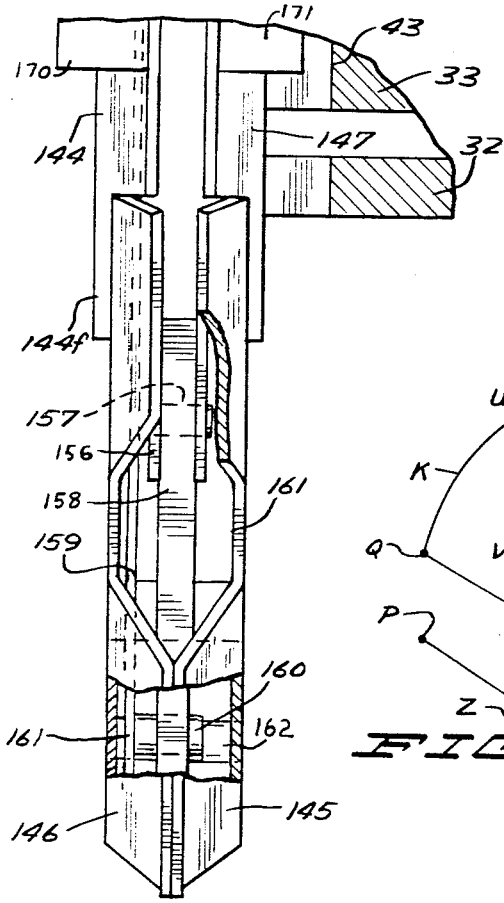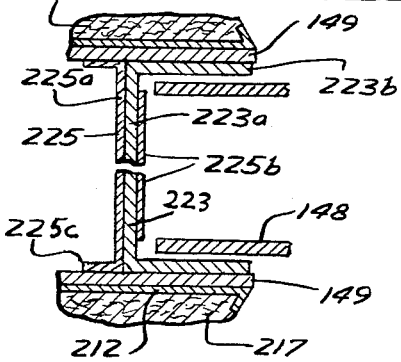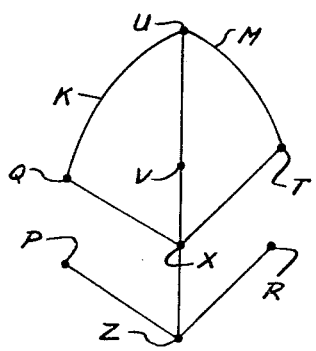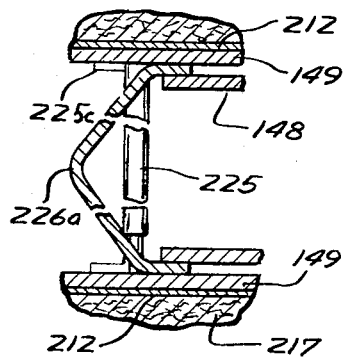

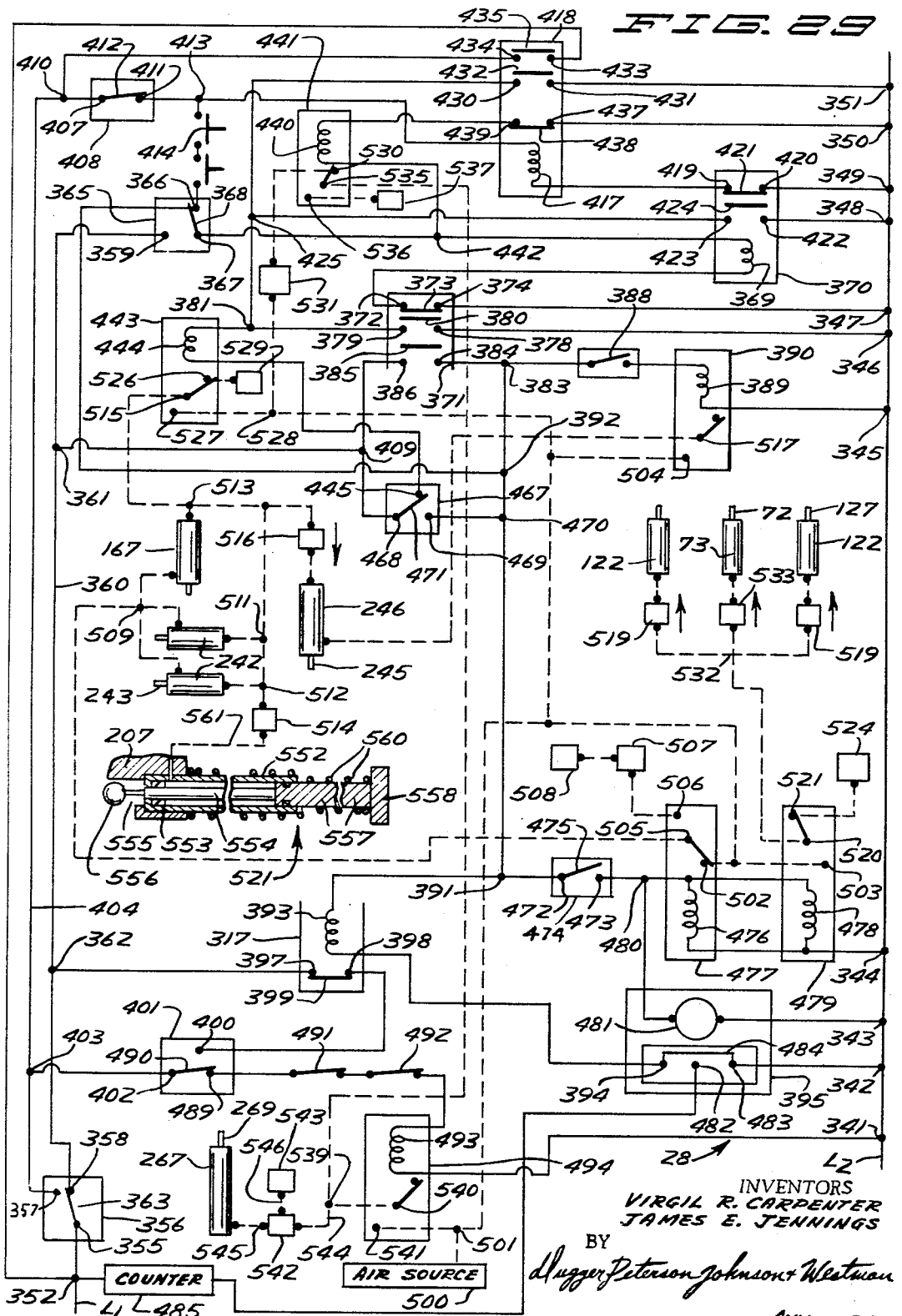

United States Patent Office 3,405,853
Patented Oct. 15, 1968

3,405,853
PANTS PRESS
Virgil R. Carpenter, Roseville, and James E. Jennings, Minneapolis, Minn., assignors to The Unipress Company, Incorporated, Minneapolis, Minn., a corporation of Minnesota
Filed Dec. 27, 1966, Ser. No. 604,996
55 Claims. (Cl. 223—74)

This invention relates to new and novel apparatus for pressing a pair of pants in a single operation. More particularly, this invention relates to a new and novel pants press that includes a stationary presser head, movable presser heads, a buck for receiving a pair of pants at one location, and mechanism for thence transferring the buck with the pants thereon to a second location to be pressed by aforementional presser heads whereby the pair of pants is pressed in a single operation.

It is desirable to be able to press a pair of pants including the torso and legs in a single pressing operation and at the same time provide sharp creases in the legs. In connection with the foregoing it is also desirable to have such a pants press that is usable for pants of different sizes and shapes including different tapers and cuts of seats and leg portions. However, there is no suitable pants press that accomplishes the foregoing in the prior art. Accordingly, this invention has been made.

One of the objects of this invention is to provide a new and novel pants press for pressing the entire portion of the pants, including torso and legs of the pants, in a single pressing operation.

Another object of this invention is to provide new and novel buck apparatus extendable into a pair of pants and expandable to draw the leg portions taut whereby a sharp crease may be obtained during the pressing operation and also to draw the seat portion of the pair of pants taut. A further object of this invention is to provide new and novel garment buck apparatus to receivingly hold a pair of pants, and having leg wings expandable outwardly of one another for drawing the leg portions taut and seat wings movable with and relative to the leg wings for drawing the seat portion of the pants taut. Still another object of this invention is to provide new and novel buck apparatus extendable into a pair of pants that has an actuator for moving the lower ends of a pair of leg wings one relative to the other and a separate actuator for simultaneously moving the upper end portions of the wings transversely outwardly of one another. An additional object of this invention is to provide buck apparatus having expandable wings together with new and novel clamp apparatus for clampingly holding the torso portion of the pants against the adjacent wings. Still another object of this invention is to provide a pants press having a buck assembly extendable into the pants and a plurality of presser heads including a movable fly head for pressing the entire pair of pants including torso and legs in a single pressing operation. Still another object of this invention is to provide in a pants press new and novel presser heads that include a stationary presser head, a pair of movable presser heads, and a fly head movably mounted on the stationary presser head for drawing the fly portion of a pair of pants taut and to have the fly area and the adjacent torso portions of the pants pressed thereagainst.

Still another object of this invention is to provide new and novel transfer mechanism in a pants press for moving an elongated pants buck assembly to translate the buck assembly vertically downwardly, thereafter vertically upwardly, then swing the buck assembly through a curved path of movement while retaining the buck assembly in a vertical condition and subsequently translate the buck assembly vertically downwardly to a pressing position. In furtherance of the last mentioned object, it is still a further object to provide new and novel cam mechanism and linkages for controlling the movement of the buck assembly so that the buck assembly will move in the aforementioned manner through the operation of a single piston cylinder combination.

Other and further objects of the invention are those inherent in the apparatus herein described, and claimed, and will become apparent as the description proceeds.

This invention is illustrated with reference to the drawings in which corresponding numerals refer to the same parts, and in which:

FIGURE 1 is a left side view of the pants press of this invention with the buck assembly in its lowermost position at the operator station, a portion of the frame and the paneling not being illustrated;

FIGURE 2 is a front view of the structure illustrated in FIGURE 1, other than portions of the structure have been broken away in order to more clearly illustrate the movable pressing head operating mechanism, the buck assembly is illustrated in a pressing position, and one of the movable pressing heads and its operating mechanism is illustrated in a presser head pressing position and the other presser head and its operating structure is illustrated in a datum position even though in actual operation both of the movable pressing heads are either in a datum position or a pressing position;

FIGURE 3 is a fragmentary top view showing the stationary presser head, one of the movable presser heads in a datum position, and the parallel arms for moving the buck assembly in the position of FIGURE 2;

FIGURE 4 is a fragmentary left hand side view illustrating the stationary presser head, the fly head in the fly head assembly pressing position in solid lines, the fly head in a datum position in dotted lines, and the movable presser head operating mechanism in a datum position, the portion of the view illustrating the stationary presser head and fly head assembly being generally taken along the line and in the direction of the arrows 4—4 of FIGURE 2, while the portion of the view illustrating the mechanism for moving the movable presser head being generally taken along the line and in the direction of arrows 4'—4';

FIGURE 5 is a left hand side view of the buck assembly with a vertical central portion thereof broken away and a portion of the buck assembly being illustrated in cross-section, said view being generally taken along the line in the direction of arrows 5—5 of FIGURE 2, and showing the leg and seat wings in a wing expanded condition.

FIGURE 6 is a fragmentary transverse view generally taken along the line and in the direction of the arrows 6—6 of FIGURE 5 to show the mounting of the front wings, the upper portion of the mechanism for moving the lower portion of the rear leg wings between a retracted and an extended condition, and part of the mechanism for moving the upper portions of the leg wings between an extended and retracted condition;

FIGURE 7 is a fragmentary side view of the upper portion of the rear leg wing assembly together with the seat wing expanders, said view being generally taken along the line in the direction of arrows 7—7 of FIGURE 8;

FIGURE 8 is a fragmentary front view of the upper portion of the assembly illustrated in FIGURE 7, said view being generally taken along the line and in the direction of the arrows 8—8 of FIGURE 7;

FIGURE 9 is an enlarged transverse cross-sectional view generally taken along the line in the direction of the arrows 9—9 of FIGURE 7 to show the pivotal mounting of the seat wings and padding;

FIGURE 10 is a side view of the upper portion of the front leg wing assembly, said view being generally taken along the line and in the direction of arrows 10—10 of FIGURE 11;

FIGURE 11 is a rear view of the structure illustrated in FIGURE 10, said view being generally taken along the line and in the direction of arrows 11—11 of FIGURE 10;

FIGURE 12 is an enlarged, fragmentary horizontal cross-sectional view generally taken along the line and in the directions of the arrows 12—12 of FIGURE 7 to illustrate part of the structure for moving the seat wings to an expanded condition;

FIGURE 13 is a fragmentary, generally horizontal cross-sectional view of the buck assembly, said view being generally taken along the lines and in the direction of arrows 13—13 of FIGURES 1, 5 and 15 other than the wings are shown in a retracted condition;

FIGURE 14 is a fragmentary horizontal cross-sectional view of one leg member of the buck assembly, said view being generally taken along the line and in the direction of the arrows 14—14 of FIGURE 1, other than the wings are in a retracted condition;

FIGURE 15 is an enlarged fragmentary end view of the hinge mechanism connecting the buck assembly leg members, said view being generally taken along the line and in the direction of arrows 15—15 of FIGURE 13;

FIGURE 16 is a fragmentary horizontal cross-sectional view of one of the buck assemblies, said view being generally taken along the line and in the direction of arrows 16—16 of FIGURE 8 with the front and rear wings in a retracted condition. This view is also generally taken along the line and in the direction of the arrows 16—16 of FIGURE 8;

FIGURE 17 is a view corresponding to FIGURE 16 other than that it is taken at a lower elevation, said view being generally taken along the lines and in the direction of arrows 17—17 of FIGURES 5, 8 and 11;

FIGURE 18 is an enlarged transverse view generally taken along the lines and in the direction of the arrows 18—18 of FIGURE 5, other than the fly clamp mechanism is in a release condition, to more clearly show portions of the fly clamp mechanism;

FIGURE 19 is a cross-sectional view of the upper portion of the stationary presser head, said view being generally taken along the line and in the direction of arrows 19—19 of FIGURE 4;

FIGURE 20 is a fragmentary cross-sectional view of the stationary presser head generally taken along the line and in the direction of arrows 20—20 of FIGURE 4;

FIGURE 21 is a fragmentary cross-sectional view of the stationary presser head, fly head, and buck assembly, said view being generally taken along the line and in the direction of arrows 21—21 of FIGURE 4;

FIGURE 22 is a left hand fragmentary view of the upper portion of the pressing apparatus of this invention in a pants pressing condition;

FIGURE 23 is a right hand fragmentary view of the upper portion of the buck assembly and transfer apparatus of this invention, said view illustrated the buck assembly and transfer apparatus in a datum condition;

FIGURE 24 is an enlarged fragmentary vertical view, part in cross-section, generally taken along the line and in the direction of arrows 24—24 of FIGURE 2 other than the cam roller and cam are shown in the FIGURE 23 position;

FIGURE 25 is a fragmentary horizontal view, parts broken away, to illustrate the mounting and mechanism for moving a safety door;

FIGURE 26 is an enlarged front view of the lower end portion of a leg member and an adjacent portion of the presser head apparatus, said view being generally taken along the line and in the direction of arrows 26—26 of FIGURE 1, other than the front wing plate and clamp are not illustrated, and said view is taken in the pressing condition;

FIGURE 27 is an elevational view of the cam member for operating the various control switches, said view being generally taken along the line and in the direction of arrows 27—27 of FIGURE 2, other than the cam member is illustrated in the datum position;

FIGURE 28 is a schematic showing of the path of movement of one parallel arm and the pivot member at either end thereof to indicate the movement of the buck assembly during one complete cycle of operation;

FIGURE 29 is a schematic, somewhat simplified, pneumatic and electrical circuit diagram, generally showing the electrical circuitry in solid lines, and the pneumatic circuitry in dotted lines other than the internal fluid connection members of the solenoid operated air valve in one condition are shown in solid lines, there also being diagrammatically shown certain of the related mechanical components;

FIGURE 30 is a fragmentary enlarged side view of the adjustment connection between the rear wing plate and the elongated link, said view being generally taken along the line and in the direction of the arrows 30—30 of FIGURE 31; and FIGURE 31 is a transverse cross-sectional view generally taken along the line and in the direction of the arrows 31—31 of FIGURE 30.

Referring now in particular to FIGURES 1, 2 and 4, the apparatus of this invention includes a main frame 20, a first movable presser head 21, a second movable presser head 22, presser head operating mechanism 23 for moving the presser heads 21, 22 between a datum position and a pressing condition, a stationary presser head 24 intermediate the movable presser heads, a fly head assembly 25 movably mounted on the stationary presser head, a buck assembly B, a buck transfer assembly 27 for moving the buck assembly between the operator station and the pressing station, and pneumatic and electrical controls 28, each of the aforementioned being generally designated. The main frame includes a base subframe 31 having a mounting member 32 bolted thereto, the base portion 33 of the stationary presser head in turn being bolted to member 32. The presser head 24 has a steam heated cavity 34 that extends nearly the entire height and width of the presser head.

The main body portion of the stationary presser head has generally vertically elongated first planar surface portions 36, 41; second planar surface portions 37, 45; intermediate recessed planar surface portions 38, 43 longitudinally between the respective first and second portions; smoothly reversely curved surface portions 39, 42 joining surface portions 36, 38 and 41, 43 respectively; and reversely curved surface portions 40, 44 joining surface portions 37, 38 and 43, 45 respectively. The surfaces of portions 36 and 37 are substantially located in a common plane while the surface of portion 38 is located more closely adjacent the longitudinal axis L—L than surfaces 36, 37 at any given elevation. Further each of the surfaces 36–38 are inclined upwardly and inwardly toward the longitudinal axis L—L. Additionally the longitudinal length of surface portion 38 at the lower end is substantially smaller than that at the upper end while the longitudinal lengths of surface portions 36 and 37 are substantially greater at the upper ends than at the lower ends. Further the stationary presser head surface portions 41 through 45 correspond to surface portions 36 through 40, i.e. of the same size and shape and at the same elevation, but are on the opposite side of the longitudinal axis L—L and inclined upwardly and inwardly toward the longitudinal axis L—L.

The stationary buck surface portions 36 and 37 respectively include a resilient pad 36a, 37b that is mounted and is of generally the same construction as that described in copending application Ser. No. 530,058, filed Feb. 25, 1966, now Patent No. 3,365,107 and assigned to the same assignee as this application; and surfaces 41, 45 include corresponding pads. Accordingly, the construction and mounting of the resilient pads will not be described. The upper end portion of the stationary presser head is generally trapezoidal in side elevation (see FIGURE 4) and has a top surface 50 that extends generally horizontally but is rounded in transverse cross-section; and a downwardly and forwardly inclined surface 51 that extends between surface 50 and arcuately curved surface 52. Surface 52 is generally triangular in cross-section in planes at right angles to the direction of inclination, other cross-sections being of progressively larger areas toward surface 52. A generally horizontally extending surface 53 extends between surface 52 and the arcuately upwardly curved surface 54, and a forwardly and downwardly inclined surface portion 55 that extends between surface 54 and the front edge of presser head. Surfaces 53, 54 are also triangular in cross-section. The upper portion of the presser head 24 also on one side of the longitudinal axis L—L includes a generally planar surface portion 60 that at one edge is bounded by surface 50, and at another edge by surface 51 and on the third edge by surface portion 61, surface portion 61 joining surface portions 60 and 36. The angle of inclination of surface 60 in an upward direction is substantially the same as that of surface 36 while the angle of inclination of surface 61 is substantially less than the angles of inclination of surfaces 36 and 60. Presser head 24 likewise has surface portions 62 and 63 that are inclined upwardly toward longitudinal axis L—L; and correspond respectively to surface portions 60 and 61 but are oppositely inclined.

The presser head 24 also has generally planar surface portions 64, 65 that are on opposite sides of axis L—L and are oppositely inclined, these surfaces being substantially closer to axis L—L than the continuation of surfaces 45, 37 at a corresponding elevation. Surfaces 64, 65 have one edge intersecting surfaces 44, 40 respectively and second edges that respectively intersect generally planar surfaces 66, 67. Surfaces 66, 67 are inclined at about the same angle as surfaces 61, 63 respectively but at a substantially lower elevation, surfaces 66, 67 joining surfaces 45, 64 and 37, 65 respectively.

Referring to FIGURES 3 and 21, the portion of the presser head providing surfaces 64, 65 and 55 has a recessed keyway transversely between surfaces 64, 65, and a groove on either transverse side of the keyway in which there is mounted a resilient strip 69.

Referring to FIGURES 2, 4 and 21, the fly head assembly 25 includes a fly head 71 that has a steam heated cavity 80, a piston cylinder combination that includes a piston rod 72 and a cylinder 73, the cylinder being pivotally connected to an upstanding bracket 74 which in turn is mounted on the mounting member 32. The piston rod at its upper end is connected to a bracket 76 which in turn is pivotally connected at 77 to the lower end of the elongated linkage 78. The upper end of the linkage is bolted at 79 to the forwardly extending flange 71a that is integrally formed with the rest of the fly head. A pair of short links 84 have their one ends pivotally connected at 83 to the linkage 78 at a location more closely adjacent pivot 77 than bolts 79. The opposite ends of links 84 are pivotally connected at 85 to ears 86 of the stationary presser head. A second set of short links 89 are pivotally connected at 90 to linkage 78 intermediate pivot 83 and bolts 79. The opposite ends of links 89 are pivotally connected at 91 to ears 92 of a stationary presser head. The ears 92 are located intermediate ears 86 and the juncture of surfaces 55 with the forward edge of the presser head 24.

A coil spring 94 has one end pivotally connected to an offset of the connection of link 89 to pivot 90 that extends radially relative pivot 90; and an opposite end pivotally connected to an offset of the connection of linkage 84 to pivot 85 that extends radially relative pivot 85. The aforementioned coil spring constantly resiliently urges the fly head to a datum position, the datum position being illustrated in dotted lines in FIGURE 4.

The fly head includes an inclined botom surface portion 71b having a key 70 that extends in keyway 68 and generally planar inclined surfaces that abut against pads 68 in a maximum fly head pressing condition; smoothly curved surface 71c that joins surface portion 71b to the lower end of the nearly vertically upwardly extending surface 71d, a top surface 71e and a front edge surface 71f. Surface 71d is generally triangular in horizontal cross-section. When the fly head has been moved the maximum amount from its datum position, surface 71e lies in the same planes as surface 50; and surface 71d is a substantial distance forwardly of surface 51 such as illustrated in FIGURE 4.

Additionally, the fly head has opposite side surfaces 71g, 71h that are inclined upwardly and inwardly toward the central axis L—L, surface 71g being located in substantially the same plane as surface 62; and surface 71h being located in substantially the same plane as surface 60. Further, the transverse width of the fly head along the surface portion 71b is substantially the same as that along surface 55. With the fly head in a pressing condition, the presser head 24 and the fly head in front elevation are of a generally isosceles triangular configuration.

The stationary presser head is located transversely intermediate presser heads 21 and 22. Each of the presser heads 21 and 22 has pressing surface portions that have counterparts to the pressing surface portions of the presser head 24 and fly head 71. For example, presser head 21 has a curved pressing surface portions 103, 104 that correspond to surfaces 42, 44 respectively other than being oppositely curved and a recessed, generally planar surface portion 102. Surfaces 102, 103, 104 in a presser head pressing condition extend to at least the same elevation as surface 50. Presser head 21 in a pressing condition has generally planar surfaces that are transversely opposing surfaces 41, 45, 63, 66; the surfaces 56, 57 of presser head 21 opposing surfaces 63, 66 respectively and diverging in an upward direction relative surfaces 63, 66; and generally planar surfaces opposite surfaces 60, 62, 71g and 71h that intersect the respective adjacent surfaces 103, 104 and are transversely outwardly offset by the same amount that surfaces 62, 61 are offset from surfaces 41, 36.

At each transverse side of the pants press, the frame includes an upright 108 having lower ends secured to the subframe 31, a longitudinally extending frame member 109, mounted on the upper end of upright 108 and an upright 110 having its lower end secured to frame member 109 at a position longitudinally centered with reference to frame member 108 (see FIGURES 1, 2 and 4). On the upper end portion of each upright 110 there is secured a pivot block 111 that through a pivot member 112 pivotally mounts the upper end portion of arm 113. The lower end of arm 113 is pivotally connected to a clevis pivot bracket 116 by a horitontal pivot member 115. Bracket 116 in turn is attached to a central portion of the movable presser head.

A pair of plates 118 are welded to frame member 109, plates 118 in turn mounting a pivot member 119 parallel to pivots 112, 115. A cam 120 is mounted on pivot member 119 and has a cam surface bearing against the lower rounded end of arm 113. The camming action provided by cam 120 and the manner of attaching bracket 116 to a presser head to permit limited pivotal movement of the presser head relative the bracket is generally the same as that described in greater detail in U.S. Patent No. 3,070,268, granted Dec. 16, 1962, other than the cam is pivoted about a horizontal axis rather than a vertical axis such as described in said patent.

In order to operate the cam 120 to move the presser head from a datum position to a pressing condition, there is provided a piston cylinder combination 122, 127 having a cylinder 122 pivotally connected at 125 to a bracket 124 which is attached to the adjacent upright 108. The piston rod 127 is pivotally connected at 123 to the cam 120, there being provided a pair of springs 126 that have one end connected to pivot member 123 and opposite ends connected to the upright 108 for resiliently urging the cam to a presser head datum condition.

In order to retain the movable presser heads generally upright in a datum condition and at the same time permit the presser heads to be moved to a pressing condition in which they are inclined upwardly and inwardly toward the general longitudinal axis L—L, for each movable presser head, on longitudinally opposite sides of the adjacent upright 108, a control arm 128 pivotally attached to the upright by a pivot member 129. The lower ends of the control arms each mount a roller 130 that bears against a respective presser head at an elevation below the clevis bracket 116. A rod 131 has one end pivotally connected to pivot member 115 and an opposite end pivotally connected at 132 to the intermediate portions of control arm 128. At an elevation above frame member 108 one end of a coil spring 134 is connected to a movable presser head and the opposite end is connected to a horizontal rod 138 which in turn is mounted by the adjacent upright 110 at an elevation above pivot 115. When the presser head is in a datum condition, the coil spring is not under any substantial tension or compression. However, when the movable presser head is moved toward a closed, pressing condition, coil spring 134 is placed under tension, the coil spring acting to resiliently urge the presser head to a datum condition.

Referring now in particular to FIGURES 5 and 6, the buck assembly B includes a pair of transversely spaced plates 140 that in part are retained in the spaced relationship by annular spacers 141 and 142 and a cross plate 143, members 141–143 being welded to plates 140. The buck assembly includes a pair of vertically elongated leg members, each leg member being of the same construction other than one is the left hand leg member and the other is the right hand leg member. The leg members diverge from one another in a downward direction. Each leg member includes vertically elongated channels 144, 147 that are of a substantially greater longitudinal dimension at the top than at the bottom, and a plurality of spacers 152 for mountingly securing channel 147 to channel 144 and retaining channels 144, 147 in proper spaced relationship (see FIGURES 5 and 14). The channel 144 has inturned flanges 144a, 144b at opposite longitudinal edges thereof that are inclined away from one another and transversely inwardly toward corresponding inturned flanges 147a, 147b of the channel 147. A plurality of longitudinally extending, vertical guide plates 153 are provided, there being one guide plate 153 welded to the inturned flanges of channel 147 at substantially the same elevation that another guide plate is welded to the inturned flanges of channel 144. As may be noted from FIGURE 14, the guide plates extend longitudinally outwardly on either side of the channels 144, 147.

The web of each of the channels 144 has an upwardly extending portion that is welded to the lower end portion of the respective plate 140. The web of each of the channels 147 has an upwardly extending portion 147c (see FIGURES 13 and 15). Welded to the left hand leg portion 147c to extend in a transverse direction of the left portion 147c in a direction toward the other portion 147c is a pair of longitudinally spaced apertured ears 602, said ears also being welded to an intermediate portion of the crotch bracket 601.

To the right hand leg member portion 147c there is welded a pair of transversely extending, longitudinally spaced ears 606, ears 602 being located longitudinally between ears 606. A pin 607 is extended through the apertures of each of the ears 602, 606, said pin being of substantially smaller diameter than the diameter of the apertures through the ears to permit the ears attached to one leg member moving relative the ears attached to the other leg member. Cotter pins (not shown) are provided to retain the pin 607 in said ears. Thus, members 601–602 and 606–607 provide a hinge connection between two buck leg members at a substantially lower elevation than the location that channels 144 are welded to plates 140. To be mentioned, bracket 601 has an elongated slot (not shown) in the left hand portion as viewed in FIGURE 5 that is longitudinally alignable with the apertures on said ears to permit the insertion of pin 607.

The depending extension 144f of the web channel 144 is welded to the upper central portion of a housing member 146, channel 147 having a similar extension welded to a housing member 145 (see FIGURE 26). Members 146, 145 are transversely spaced except for lower inclined flanges that are joined, said members providing a linkage housing.

Each leg member includes a flexible front wing plate 148 and a flexible rear wing plate 149, each plate being elongated in a vertical direction and preferably made of stainless steel of a thickness in the range of about .015 to .020 inch. The wing plates 148, 149 of each leg member are located transversely between the channels 144, 147 and the guide plates that are welded to the respective channel. Further, the front wing plates in a longitudinal retracted condition have rear edge portions extended into notches in spacers 152 while plates 149 have notched portions 149c that extend into notches in the spacers that are opposite the first mentioned spacer notches.

A bottom wing clamp 150 extends horizontally between plates 145, 146 and is pivotally attached thereto by a transverse pivot member 151 that is forwardly of channels 144, 147 (see FIGURE 5). The bottom clamp 150 clampingly holds the lower edge portion of the front wing plate 148, a desirable manner of forming the clamping attachment between clamp 150 and plate 148, and the other wing plate clamps and the adjacent portions of the wing plates having been set forth in detail in U.S. Patent No. 3,272,408, granted Sept. 13, 1966, and therefore will not be further described.

To the lower end of each rear wing plate there is clampingly attached a clamp 154, clamp 154 in turn being pivotally attached by pivot member 155 to one end portions of a pair of elongated links 156. Referring in particular to FIGURES 30 and 31, pivot member 155 has a cylindrical portion 155b and a rectangular projection 155a extending outwardly therefrom on either axial side thereof, but offset from the central axis of the cylindrical portion. The cylindrical portion is mounted in the apertures 623 of the clamp 154 and is extended through a corresponding aperture of rear wing plate 149, said apertures forming a relatively close fit with portion 155b. In the wing member assembled condition each projection 155a extends into the rectangular portion 621 of the keyway slot 621a, each slotted portion 621 being of a size to prevent projection 155a turning therein. Portion 621 opens downwardly into circular slotted portion 622 which is of a diameter to have circular portion 155b inserted therethrough. By loosening or removing the nuts of bolts 200, clamp 154 may be moved relative link 156 such that apertures 154 are coextensive with slotted portions 622 and the pivot member 155 rotated 90°, 180° or 270°. After the pivot member is rotated, the wing plate 149 is elevated relative to links 156 to move the projections into slotted portions 621 and the nuts on bolts 200 tightened. Through the provision of the pivot member, which has projections 155a eccentrically located relative the cylinder portion, and the keyway slots, there can be made any one of four limited adjustments of tension in plate 149.

Pivot member 151 is of the same construction as pivot member 155 while the clamp 150 is provided with apertures corresponding to apertures 623. Housing members 145, 146 have keyway slots corresponding to said slot 621a. As a result pivot member 151 permits the adjustment of tension in plate 148 in the manner described in the preceding paragraph. Thus pivot members 151, 155 and associated structure permit an adjustable feature to permit equalization of the tension in the wing plates.

Links 156 in turn have their opposite end portions pivotally connected at 157 to the one end portion of an angular pivot arm 158, the pivot arm in turn having its mid portion pivotally connected through a transverse pivot member 159 to housing members 145, 146. The opposite portion of the pivot arm through a pivot 160 pivotally mounts the lower end portion of an elongated control arm 161. A generally right angular control arm 163 has one end portion extending between links 156 and is pivotally connected to intermediate portions thereof by a pivot member 164, the opposite end portion of link 163 extending between plates 145–146 and being pivotally connected thereto by a pivot member 162. Pivot members 159 and 162 cannot move relative plates 145 and 146, and pivot member 159 is located at a higher elevation and longitudinally forwardly of pivot member 162.

The control arms 161 slidably extend upwardly through the respective set of channels 145, 146, upwardly transversely between plates 140, and at their upper ends are pivotally connected by a pivot member 165 to the lower end of a piston rod 166 of a piston cylinder combination that also includes a cylinder 167 (see FIGURES 5 and 6). The cylinder 167 is mounted on plate 143 and has piston rod 166 slidably extended through an aperture in said plate. While operating the piston cylinder combination 166, 167, the control arms 161 operate the respective set of linkages 156, 158 and 163 to move the lower end portions of the rear wing plates between a wing extended condition of FIGURE 5 and a retracted condition.

The upper end portions of each of the front wing plates extend one on either side of the longitudinally extending bar 172 and transversely diverge from one another in a downward direction (see FIGURES 10 and 11). Each wing plate extends between a clamp plate 173 and bar 172, a clamp plate and wing plate being secured to the bar 172 through the provision of screws 174. A bolt 175 has a lower end portion attached to bar 172, and an intermediate portion slidably extended through an offset 176 of a generally J shaped mounting bar 177 (see FIGURES 5 and 6). A coil spring 178 has one end portion abutting against the head of the bolt 175 and an opposite end portion bearing against a washer which in turn abuts against offset 176 whereby the front wings are resiliently urged in an upward direction relative to pivot 151 to maintain the front wings in constant tension. Bar 177 has a portion extending below offset 176 that extends between bars 173 but is movable relative thereto.

Bar 177 has an ear located vertically above offset 176 that extends between a pair of bars 182 that is pivotally connected to the one end portions of said bars by a transverse pivot 183. One end portion of a short link 185 extends between intermediate portions of bars 182 and is pivotally connected thereto by a pivot member 184, the opposite annular end portion of link 185 being pivotally mounted on a pivot member 186 which in turn is mounted by plates 140. The annular end portion of link 185 is transversely elongated to aid in maintaining the spacing between plates 140.

One end portion of an elongated control link 188 extends between bars 182 and is pivotally connected to said bars by a pivot member 189, the intermediate portion of the control link being pivotally mounted on a pivot member 190 which in turn is mounted in a fixed position by plates 140 at a higher elevation and rearwardly of the pivot member 186. The second end portion of control link 188 extends between the one end portions of a pair of elongated swing bars 191 and is pivotally connected thereto by pivot member 192. One end portion of a swing link 193 extends between bars 191 and is pivotally connected thereto by a pivot member 194, the opposite end portion extending between plates 140 and being pivotally connected thereto by a pivot member 195. Pivot member 195 is located longitudinally rearwardly and at a higher elevation than pivot member 190.

Longitudinally rearwardly of pivot member 194, a depending offset of rocker 198 extends between bars 191 and is pivotally connected thereto by a pivot member 199. Slidably extending through each longitudinal end portion of the rocker 198 is a stud 200, each stud extending through a coil spring 201 having one end bearing against the rocker and an opposite end bearing against a nut threaded on the respective stud. Each stud has a lower end portion attached respectively to a block 203 and an ear of mounting member 207 (see FIGURES 7 and 8), said ear and block 203 being longitudinally spaced by a greater distance than the longitudinal width of the rocker offset.

Each rear wing 149 has a pair of longitudinally spaced, upwardly extending ears 149a, the front ears of the two rear wing plates being attached to opposite sides of block 203 by screws extended through block 204, the respective ears and threaded into block 203. The rearward ears of the rear wings likewise extend upwardly on each side of the tab of member 207 and are secured thereto by screws 205 extended through blocks 206 and threaded into a mounting member 207. As a result of providing the aforementioned structure, the rear wing plates can pivot a limited amount about the axis of the transverse pivot member 199 relative the clamp bars 191, and additionally move a limited amount away from and toward the pivot member due to springs 200 resiliently urging the upper wings toward said pivot member. Springs 200 also act to retain the rear wing plates in tension.

Each of the rear wing plates 149 pivotally mounts by a pivot member 210, a pair of seat wings 211, 212 with the wing plate being extended therebetween (see FIGURES 7 and 9). The pivot member is extended between the lower rear corner portions of the seat wings somewhat forwardly of the rearward edge of the rear wing plate. Generally horizontally forwardly of the pivot member, each wing plate 149 is provided with a vertically elongated slot 214 through which a pin 215 is extended, one end of the pin being secured to seat wing 211 and the opposite end to seat wing 212. To prevent the seat wing 212 from moving transversely outwardly relative the rear wing plate, the upper edge portion 219 thereof is slidably extended between a depending portion of block 204 and a rear wing plate, while the upper edge portions of wings 211 are extended between the depending offset of block 203 and the adjacent rear wing plate (see FIGURE 8).

The seat wings 211, 212 have rearward edge portions that are generally transversely opposite one another and are bulged in a longitudinally rearward direction intermediate the top and lower edges thereof such as is shown in FIGURE 7. However, the front inclined edge 211b of wing plate 211 is located a substantial distance transversely rearwardly of the front edge 212b of the seat wing 212 such as shown in FIGURES 7 and 13. Further, the rearward edge portions of seat wings 211, 212 are connected together by a pin 218 that is located adjacent the rearward edges thereof and at an elevation somewhat below the top edges. The pin 218 serves to limit the pivotal movement of the seat wings relative the rear wing plate in the direction of the arrow 219 about the pivot 210, the pin in the maximum retracted condition of the seat wings relative the rear wing plate abutting against the edge of the cutout 220 of the rear wing plate (see FIGURE 7). The cutout 220 is curved relatively sharply downwardly in a longitudinally forwardly direction, than it is reversely curved, and then downwardly and less sharply rearwardly such as shown in FIGURE 7 until a portion of the rear wing plate is generally extending downwardly transversely opposite the lower portion of the seat wing when the wings are in an extended condition of said figure.

Referring now to FIGURES 12 and 29, in order to move and resiliently retain the seat wings in the extended condition of FIGURE 7, a transverse cross piece 556 of the piston cylinder combination 521 has one end portion extended between the upper end portions of forward edge flanges 211a of the seat wings 211 and a block 213 that is attached to the upper front corner portion of the respective seat wing. As may be noted from FIGURE 12, the cross piece is free to move in a horizontal direction a limited amount relative wings 211 before it engages either flanges 211a or blocks 213. Normally cross piece 556 is retained in abutting engagement with blocks 213 to urge the seat wings to the expanded condition of FIGURE 7 through a structure which will be described hereinafter.

Referring now to FIGURES 7, 8 and 16, one leg of a generally U-shaped channel 223 is riveted to one wing plate 149 adjacent its forward edge thereof, said channel having a web portion 223a extending between wing plates 149 and a second leg extending in abuttable engagement with the other rear wing plate. Thus the channel opens in a forward direction. A vertically elongated bracket 225, which is generally U-shaped in horizontal cross-section has one leg 225c riveted to the other rear wing plate 149 such that said one leg extends rearwardly of its web 225a. Web 225a has a planar surface portion extending along one side of web 223a, and a tongue 225b is integrally joined to the lower edge of web 225a to extend along the opposite side of the web 223a. As may be noted from FIGURE 16, the transverse width of tongue 225b is substantially smaller than the corresponding dimension of web 223a. As a result of providing members 223, 225, one wing plate 149 can move relative the other wing plate 149 a limited amount in a transverse direction or in a vertical direction while at the same time the channel 223 serves to space said wing plates. In this connection as may be seen from FIGURE 8 web 223a is of a progressively increasing horizontal dimension in a downward direction.

Bracket 226 has one leg riveted to the rearward edge of a front wing plate 148, a second leg riveted to corresponding edge of the other wing plate 148 and a generally V-shaped portion 226a joining said legs (see FIGURES 10, 11 and 17). The V-shaped portion 226a has an apex portion that is located substantially centrally of plates 148 and a substantial distance rearwardly thereof. A second bracket 227 likewise has legs riveted to the rearward edge portions of plates 148 and a generally V-shaped central portion joining said legs, the legs of bracket 227 being spaced less than those of bracket 226 and being riveted to the upper corner portions of plates 148. The brackets 227, 226 are vertically spaced by a distance greater than the vertical height of channel 223 and bracket 225 and are located such that in the wing plate retracted conditions, channel 223 is located vertically between brackets 226, 227 with the web portion being horizontally forwardly of the apex portion of brackets 226, 227. Brackets 226, 227 in addition to facilitate the spacing of wings 148, also may aid in spreading wings 149; it being noted that in a retacted condition upper portions of wings 148 overlap portions of wings 149 and are located transversely therebetween.

Not previously mentioned is that each of the wing plates 148 has an integrally formed, vertical, somewhat rectangular offset portion 148c that extends a substantial distance horizontally rearwardly of the part of the wing that depends or extends therebeneath. The brackets 226, 227 are secured to portions 148c. Further portions 148c extend a slightly lower elevation than the crotch bracket 601 (see FIGURE 5) but are at a higher elevation than any of the spacers 152. Additionally in wing plate retracted condition the rearward edge of portion 148c is a small distance forwardly of the web 223a of channel 223.

Referring now to FIGURES 7–9, 12 and 13, the transversely adjacent seat wings 211 each have reversely but inclined front flanges 211b and bottom flanges to facilitate retaining the resilient padding 216 on the respective wing, there being a cloth covering over the padding and flanges. The bottom portion of the padding for each wing 211 and bottom flange is tapered downwardly and inwardly toward the respective wing plate 149 such as illustrated at 216a in FIGURE 8, while the rear edge portion is tapered forwardly and outwardly of the wing plate. The thickness of the padding at a location spaced from the tapered portions is many times greater than that of wing plate 149 and slightly greater than the transverse offset of, for example, surface 41 from surface 62; while tapered portion 216a of one seat wing (with no parts or buck assembly 13) will form a pressing fit with surface 63 in a pants pressing condition.

Seat wings 212 each include reversely inclined flanges, namely front vertical flange 212b; a curved vertically extending rear flange 212a; and a bottom flange 212c for mounting padding 217. Padding 217 is tapered along these flanges, the bottom tapered portion 217a of one wing being located to form a pressing fit with surface 56 of presser head 21 and the other seat wing tapered portion 217a being seatable against a counterpart surface of presser head 22 with the buck assembly and presser heads in a pressing condition and no parts on said assembly. The padding 216 and 217 are the same but oppositely faced and extend to a somewhat lower elevation than the lower elevation of the crotch line of pants dressed on the buck assembly.

On each transverse side surface of each front wing plate 148, forwardly of portion 148c and extending to a lower elevation than the seat wings offset portion 148c, there is secured cloth covered resilient padding 230, in part by clips 231. Padding 230 is tapered at its forward, rear and bottom edges. The bottom edge of the padding on the transverse inner surface of the wing plates is tapered to form a seating fit with surfaces 66, 67 respectively in a pressing condition which the bottom edges of the padding on the transverse outer padding forms a seating fit respectively with surface 57 of presser head 21 and the counterpart surface of presser head 22. Padding 230 extends to a lower elevation than the front pockets of the pants to be pressed.

It is to be noted portions of the inturned flanges of channels 144, 147 are cut away to permit the seat wings and the front wing plates respectively with the padding thereon to move to the retracted position of FIGURE 13.

The channels 144, 147 of each leg member together with the cloth covered padding thereon are of dimensions to form pressing fits with presser head surfaces 102, 103, 104 of presser head 21; the counterpart surfaces of presser head 22, and surfaces 38, 39, 40, 42, 43 and 44; while the wings form pressing fits with the respective set of presser head and fly head surfaces longitudinally on either side with the first mentioned surfaces when the apparatus of the invention is in a pressing condition.

Referring now in particular to FIGURE 1, the transfer assembly 27 will now be described. The transfer assembly includes an upright piston cylinder combination having a piston rod 269 (see FIGURE 2), and a cylinder 267 that is attached to one end portion of a transverse angle iron 266 and has a mid portion extending through plate 268 that is welded to an upright, generally U-shaped channel 265. The channel has its lower end welded to the front left hand corner portion of the subframe 31, the angle iron forms a portion of said subframe. To the upper portion of channel 265 there is welded a plate 270. A post 271 has a lower end piston welded to plate 270, the end portion of a post being directly transversely to the left of the piston cylinder combination 268–269.

A transfer mounting block 276 is mounted on the upper end of the piston rod 269 to move therewith (see FIGURES 1, 2, 22 and 23). The transfer block in turn pivotally mounts transverse pivot rods 277 and 278 to pivot about transverse horizontal axes, pivot rod 277 being located rearwardly of and at a slightly lower elevation than pivot rod 278. One end of the pivot rod 277 is keyed to an elongated arm 279, the opposite end of arm 279 mounting one end of a pivot rod 280. Pivot rod 280 extends through appropriate apertures in plates 140 and through the annular spacer 141 (see FIGURE 5). Pivot rod 278 mounts an end of arm 281, the other end of the arm mounting a pivot member 282 which is extended through appropriate apertures in plates 140 and through the annular member 142. Arms 279 and 281 are mounted in parallel relationship and through the pivot members 280, 282 support the buck assembly B.

On the transverse opposite side of block 276 from arm 279, one end portion of an elongated control arm 285 is clamped to pivot member 277 to extend radially therefrom in a direction directly opposite from the direction of the radial extension of arm 279 relative said pivot member. The opposite end of the control arm mounts a transverse stud shaft 284 that extends transverse in a direction toward post 271, said shaft mounting a cam follower roller 286 (see FIGURES 22 and 24). Intermediate pivot member 277 and the roller 286, the arm 285 has an elongated slot 287, the axis of elongation (represented by line 288 in FIGURE 24) being offset from the central axis of shaft 284.

A transverse pivot member 290 is extended through the upper end portion of post 271 and pivotally mounts one end portion of a cam arm 291 (see FIGURES 22 and 23). The opposite end portion of the cam arm has a cam 295 integrally joined thereto. A central boss of arm 285 mounts a stud shaft 292 which slidably extends through slot 287 and on the opposite side of arm 285 from the cam, shaft 292 mounts a roller 293, that is of a substantially larger diameter than the width of the slot (see FIGURE 23).

Cam 295 that has a web portion 295a and a flange 295b extending transversely outwardly from said web portion in a direction toward arm 285. The cam is provided with a cutout 297, flange 295b having a constant inner radius of curvature about the axis of shaft 292 and extending through an arc of an angular dimension of approximately 295°. The terminal edges 295d, 295e of the flange 295b are tapered to facilitate the movement of the cam follower roller 286 into abutting engagement with the inner arcuate surface of the flange 295b as will be described more fully hereinafter.

Referring now in particular to FIGURES 5 and 18, the fly clamp mechanism includes a piston cylinder combination having a piston rod 245 and a cylinder 246 that is pivotally connected by pivot member 247 to depend from the hook portion of arm 177. The lower end of the piston rod mounts a block 248 to move therewith, a manual control knob 249 being attached to the block to extend forwardly thereof. To each transverse side of a block 248 there is pivotally connected one corner portion of a triangular plate 250 by a pivot member 251. The second corner portions of the plates 250 extend on opposite sides of the bar 177 and are pivotally connected to said bar by a pivot member 252 at an elevation slightly above the offset 176. To the third corner portion of one of the plates 250 there is welded a transverse pin 253 that extends outwardly therefrom. One end of a coil spring 254 is connected to the outer end of the pin while the opposite end of the coil spring is connected to an extension of pivot member 183 for constantly resiliently urging triangular plates, as will subsequently be described.

To the lower surface of block 248 there is dependently attached a pair of arms 256 that diverge outwardly from one another in a downward direction. The lower end of each arm mounts a clamp 257 in a position that with the piston rod extended and the front wings in either a retracted or an extended condition, each clamp will clampingly abut against the upper fore edge portion of the respective front wing (provided the pants are pressed on the buck B). Each clamp has a vertical groove (not shown) facing the respective front wing.

In order to move the upper portions of the wing plates 148, 149 between a retracted and an extended condition there is provided a piston cylinder combination on opposite sides of plates 140, each piston cylinder combination including a piston rod 243 and a cylinder 242 (see FIGURES 1 and 22). The one ends of the cylinders are pivotally connected to a pivot member 244 that extends through the plates 140 forwardly of and at a slightly lower elevation than pivot member 186 (see FIGURE 5). The outer ends of the piston rods extend along opposite sides of swing arms 191 and are pivotally connected to the pivot member 199.

Referring now in particular to FIGURES 1, 22 and 25, to the web portion of the left hand channel 265 there is attached upper and lower angle brackets 311, each bracket mounting a transverse bolt 312. On each belt 312 there is rotatably mounted a sprocket 313, a chain 314 being extended around the sprocket and having opposite ends of the rear run connected by a block 315. To block 315 there is attached one end portion of a bracket 316, bracket 316 having an intermediate portion that is inclined forwardly in a direction toward the longitudinal axis L—L, and an opposite end portion that is bolted to a safety door 317. Door 317 has one vertical edge portion slidably retained in a guideway 318 that is attached to an adjacent leg in the left hand channel 265. The opposite vertical edge portion of the doorway is slidably retained in a guideway 318 that is attached to a panel 319 which in turn is mounted on the right front upright 320 (see FIGURE 4). The channels 318 extend the entire height of the upright 320 and channel 265, the height of the door being about half of the height of the guideways.

A vertically elongated channel 323 that is U-shaped in horizontal cross-section has its lower end portion connected to a mounting member 324 which in turn is connected to the link chain 314. The opposite end of channel 324 is attached to the transfer block 276 to move therewith.

At the time buck assembly is in its lowermost position at the operating station (see FIGURE 1) and also its lowermost position at the pressing station, such as illustrated in FIGURE 22, the door extends vertically from an elevation adjacent the top of transverse channel 273 to the upper ends of the upright 320 and channel 265; but when the buck assembly is at its maximum elevation, the top edge of the door is adjacent channel 328. That is, as the transfer block 276 is moved in an upward direction from the position of FIGURE 22, or FIGURE 21, channel 323 is moved in the same direction to cause chain 314 to pivot in the direction of arrow 326 about the upper sprocket 313. This results in the rearward run of the chain moving block 315 and bracket 316 in a downward direction whereby the door is lowered. However, when the mounting block 276 is moved in a downward direction upper sprocket 313 is pivoted in a direction opposite arrow 326 and as a result the door is moved in an upward direction. Due to the provision of the door and the aforementioned movement thereof, at the time the presser heads are being moved to closed position the door is at an elevation of the upper portion of the body of the operator and thus prevents the operator from moving his hand between the movable presser heads.

A cam 330 is secured to arm 291 transversely between said arm and post 271 by a plurality of screws to rotate with said arm. Pivot member 290 extends through the central portion of said cam. For purposes of further describing the cam, it will be considered that the cam as shown in FIGURE 27 is in a datum position wherein the reference line 331 extends through the pivotal axes of pivot member 290 and pivot member 292. At this time the reference line is approximately 135° relative the horizontal.

Cam 330 has a main body 330a that is generally planar and a plurality of cam surface portions that extend transversely outwardly of the main body in a direction away from the switch mounting box 332, except for offset 340 which extends transversely in the opposite direction, to operate the various switches mounted in said box as will be subsequently described. Box 332 is secured to the upper end of post 271 at an elevation above pivot 290.

An arcuately elongated fly switch operating flange 333, 334, 335 has a central portion 334 joined to the main body 330a to extend radially outwardly therefrom, portion 334 lying in substantially the same plane as the main body while portion 333 is inclined transversely away from post 271 in a counterclockwise direction and portion 335 is inclined transversely away from said post in a clockwise direction. Intermediate portion 334 extends angularly from about 0° to a 50° position of FIGURE 27. Radially inwardly of portion 333 is a cancel offset 336 (operates the neutral switch) that extends angularly between about 55°–68°, offset 336 in a clockwise direction first being inclined transversely away from the post and then toward said post.

The main neutral switch operating portion of the cam includes tabs 337, 338 and cutout 339, the cutout extending angularly between about 110° to 125°. Tab 338 in a clockwise direction is inclined transversely away from the post while tab 337 is inclined transversely toward the post. The center switch operating portion of the cam includes a tab 325, a cutout 327 and a tab 329, the cutout extending between about 125° to 136° angular position of the cam. In a clockwise direction, tab 329 extends transversely away from the post while tab 325 extends transversely toward the post. For operating the end switch, the cam has an offset 340 that extends angularly between about 285° to 306°; the offset in a counterclockwise direction first extending transversely toward the post and thence transversely away from the post. It is to be noted that members 336, 337, 338, 340, 325 and 329 are integrally joined to the main body 330a along at least one edge.

Referring now in particular to FIGURE 29, the electrical and pneumatic controls 28 includes a pair of main lines $L_1$ and $L_2$, line $L_2$ having junctions 341 through 351 located thereon. Line $L_1$ has junction 352 thereon and is connected to a first terminal 355 of a cancel switch 356. The cancel switch includes a second terminal 357, a third terminal 358, and a switch member 363 that is connected to first terminal 355 and resiliently urged to connect terminals 355, 358. A line 360 has junctions 361 and 362 thereon and connects terminal 358 to terminal 359 of a neutral switch 365. The neutral switch includes a second terminal 366, a third terminal 367, and a switch member 368 that is connected to terminal 367 and is resiliently urged to connect terminals 359, 367.

A solenoid coil 369 of a cancel relay 370 is connected across terminal 372 of a main relay 371 and junction 442 which is connected by a line to terminal 367. Relay 371 includes a second terminal 374 that is connected to junction 347 and a normally closed switch member 373 for electrically connecting terminals 372, 374. Relay 371 also includes a third terminal 378 that is connected by a line to junction 346, a fourth terminal 379 that is connected by a line to junction 381, and a normally opened switch member 380 for electrically connecting terminals 378, 379 when the relay is energized. Relay 371 also includes a fifth terminal 384 that is connected by a line to junction 383, a sixth terminal 386 that is connected by a line to junction 409 which in turn is connected by a line to junction 361, and a normally opened switch member 385 for electrically connecting terminals 384, 386 when the relay is energized. A fly clamp switch 388 which is resiliently urged to an open condition and the solenoid coil 389 of the solenoid operated air valve 390 are connected in series across junctions 383 and 345. A line also connects junction 383 to junction 391, junctions 392 and 470 also being provided on said line.

Relay 371 additionally includes a solenoid coil 393 that is connected across junction 391 and a first terminal 394 of the timer 395. Further, relay 371 includes a seventh terminal 397 that is connected by a line to junction 362, an eighth terminal 398 that is connected by a line to a first terminal 400 of a presser head limit switch 401, and a normally closed switch member 399 that electrically connects terminals 397 and 398. The head limit switch 401 also includes a second terminal 402 that is connected by a line to junction 403, junction 403 being located on line 404 which connects terminal 357 to a terminal 407 of a center switch 408. Also provided on line 404 is junction 410. The center switch also includes a terminal 411 connected by a line to junction 413 and a switch member 412 that is movable to electrically connect terminals 407 and 411 but is resiliently urged to an open condition. A pair of normally open hand operated switches 414 are connected in series across junction 413 and terminal 366.

A solenoid coil 417 of a buck transfer relay 418 is connected across junction 413 and a first terminal 419 of cancel relay 370. Relay 370 also includes a second terminal 420 that is connected by a line to junction 349 and a normally closed switch member 421 for electrically connecting terminals 419 and 420. Relay 370 additionally includes a third terminal 422 that is connected by a line to junction 348, a fourth terminal 423 and a normally opened switch member 424 for electrically connecting terminals 422 and 423 when coil 369 is energized. Terminal 423 is connected by a line to junction 425 which in turn is connected by a line to junction 381. Junction 425 is also connected by a line to a first terminal 430 of relay 418, relay 418 also including a second terminal 431 that is connected by a line to junction 351 and a normally opened switch member 432 that upon energization of coil 417 electrically connects terminals 430, 431. Relay 418 additionally includes a third terminal 433 that is connected by a line to junction 352, a fourth terminal 434 that is connected by a line to junction 410 and a normally open switch member 435 that upon energization of coil 417 electrically connects terminals 433 and 434. Relay 418 usually includes a fifth terminal 437 that is connected by a line to junction 350, a sixth terminal 439 and a normally closed switch member 438 that is moved to an open condition by the energization of coil 417. Solenoid coil 440 of solenoid operated air valve 441 is connected across terminal 439 and junction 442.

The solenoid coil 444 of solenoid operated air control valve 443 is connected across junction 381 and a first terminal 445 of the foot switch 467, the foot switch including a terminal 468 that is connected by a line to junction 409 and a third terminal 469 that is connected by a line to junction 470. The foot switch also includes a switch member 471 that is resiliently retained in a position to electrically connect terminals 468 and 445, but is movable to break the aforementioned connection and electrically connect terminals 468, 469.

Junction 391 is connected by a line to the first terminal 472 of end switch 474, the end switch having a second terminal 473 that is connected by a line to junction 480, and a switch member 475 resiliently retained in an opened condition but movable for electrically connecting terminals 472, 473. Solenoid coil 476 of the solenoid operated air valve 477 and solenoid coil 478 of solenoid operated air control valve 479 are connected in parallel across junctions 480 and 344.

The timer motor 481 of the timer 395 is connected across junctions 480, 343, the timer including a second terminal 482, and a third terminal 483 that is connected by a line to junction 342. The timer also includes an internal switch member 484 that normally electrically connects terminals 394, 483, but a selected time interval after the energization of motor 481, breaks the aforementioned connection and for a short duration electrically connects terminals 482, 483, and thereafter again electrically connects terminals 394, 483. A counter 485 is connected across junction 352 to terminal 482.

The head limit switch 401 includes a third terminal 489 and a switch member 490 that is resiliently retained in a position to electrically connect terminals 402, 400, but is movable to electrically connect terminals 402, and 489. A fly head limit switch 491, fly clamp switch 492, and solenoid coil 493 of a solenoid operated air control valve 494 are connected in series across junction 341 and terminal 489. Switches 491 and 492 are of a type that are resiliently retained in an open condition but are movable to a closed condition, and when both are in a closed condition, an electrical connection is provided between terminal 489 and the solenoid coil 493.

The pneumatic circuitry includes a source of pressurized air 500 that is connected to junction 501, junction 501 in turn being connected to the inlet ports 502, 503 and 504 of solenoid air control valves 477, 479 and 390 respectively and to junction 528. Valve 477 has a control port 505 that is connected to junction 509 and an exhaust port 506 that is connected through a relief valve 507 to an exhaust muffler 508. Valve 507 is of a type that permits air exhaust from port 506 to muffler 508 when the air pressure at port 506 is above a predetermined level, for example, 50 p.s.i. at port 506, but blocks this path when the pressure falls to said level.

The junction 509 is connected to the one ends of the cylinders 242, 242 and 167, and the opposite ends of cylinders 242, 242 and 167 are fluidly connected to junctions 511, 512, 513 respectively that are connected by lines to one another. Junction 512 is connected through needle valve 514 and line 561 to one end of the cylinder sleeve of piston cylinder combination 521. Junction 513 is also connected to the control port 515 of valve 433 and is connected through a one way flow control 516 to the upper end of cylinder 246. The opposite end of cylinder 246 is connected by a line to control port 517 of valve 390.

Valve 479 includes a control port 512 connected to junction 532. A separate one way flow control 519 provides a fluid connection between the lower ends of each of the cylinders 122, 73, 122 respectively and junction 532. Valve 479 also includes an exhaust port 521 that is connected to a muffler 524 while the exhaust port 526 of valve 443 is also connected to a muffler 529.

The inlet port 527 of valve 433 is connected to junction 528, there being provided a non-bleeding type regulator 531 across junction 528 and an inlet port 530 of valve 441. Due to the provision of regulator 531, air at constant, substantially lower pressure is applied to port 530 than that available at junction 528.

Valve 441 also includes an exhaust port 536 that is connected to the exhaust muffler 537 and a control port 535 that is connected by a line to junction 539. Junction 539 is connected to a control port 540 of valve 494, valve 494 having an inlet port 541 that is connected to junction 501. Junction 539 is also connected through line 544 to a quick exhaust 542, said quick exhaust being connected by line 546 to muffler 543 and through line 545 to the lower end of the transfer cylinder 267. The quick exhaust is of a conventional type that when air under nearly constant pressure is beng applied to line 544 there is provided a passageway through line 545 to transfer cylinder, but the passageway to muffler 543 is blocked. However, if there is a sudden drop in pressure in line 544, which will occur when the valve operating member of valve 441 connects ports 536 and 535, then the quick exhaust provides an open passageway between lines 545, 546 to quickly exhaust air from cylinder 267 through muffler 543. After the cylinder is exhausted, and the air pressure in line 544 is increased, the quick exhaust provides an open passageway between line 544, 545.

The seat wing operating piston cylinder combination 521 includes a cylindrical sleeve 552 having one end portion extended into a bore formed in an offset portion of support member 207. An elongated rod is extended through said sleeve and has an intermediate diameter portion 554 of a substantially smaller diameter than the inside diameter of the sleeve 552, an enlarged diameter portion 557 that is joined to one end of portion 554 and has a diameter that is substantially the same as inside diameter of said sleeve, and a reduced diameter portion 555 that has one end joined to the opposite end of the intermediate diameter portion from portion 557. To the opposite end of the reduced diameter portion there is secured a cross piece 556. A seal member 553 is mounted in the forward end of the cylinder sleeve to provide a fluid seal between said sleeve and portion 554, a fluid line 561 opening through the cylinder sleeve between seal member 553 and the junction of portions 554, 557. A coil spring 560 is provided on the cylinder sleeve and has one end bearing against support member 207 and the opposite end against cap 558 that is mounted on the rear end of portion 557 to constantly resiliently urge members 554, 558 to a position that the seat wings are in an expanded condition relative the rear wing plates such as shown in FIGURES 5 and 7. An O-ring is also provided on portion 557 to provide a fluid seal between said portion and the cylinder sleeve.

The structure of the invention having been described, the operation thereof will now be set forth. For purposes of facilitating description of the operation of the invention, it is to be assumed that the apparatus is in the datum condition (see FIGURE 23), the controls being illustrated in such a condition in FIGURE 29, that power is applied to cross lines $L_1$–$L_2$ and air under pressure is applied at junction 501. In a datum condition, the presser head 21 is in the open position of FIGURE 2 and presser head 22 in a corresponding open position opposite the longitudinal axis, the buck assembly in the position of FIGURE 23 with the leg wings retracted, the fly clamp is in a clamping position, and the fly head is in the dotted line position of FIGURE 4. In the datum condition, the fly head operating bracket 76 retains the switch member of switch 492 in a closed condition, switch 492 being mounted on the channel 273 which extends between channel 265 and upright 320 (see FIGURE 4). Arm 113 of presser head 21 in a datum condition retains switch member 490 of switch 401 to form an electrical connection between terminals 402 and 489 while arm 113 of presser head 22 retains switch 491 in a closed condition. Switches 401, 491 are mounted on the respective upright 110 (see FIGURE 4). Also in a datum condition, switch members 475, 412 and 368 bear against the main body portion of cam 330 (90° angular position of said cam as illustrated in FIGURE 27) whereby switch member 368 forms an electrical connection between terminals 366 and 367, switch member 412 electrically connects terminals 407, 411; and switch member 475 is in an opened condition. At this time switch member 388 extends transversely across the main body of the cam and accordingly is in an opened condition.

In the datum position, valve 494 has no internal connection between ports 540, 541 or port 540 and any other port, while the control port 535 of valve 441 is connected to the inlet port 530. Accordingly, air under pressure is applied through regulator 531, control port 535 and the quick exhaust 542 at a sufficient pressure that piston rod 269 of the transfer piston cylinder combination is retained in an intermediate position. However, the pressure applied at port 535 is not sufficiently great to raise the piston rod above the datum position, it being noted that due to construction of the transfer mechanism and the connections thereof to the buck assembly there is required, for example, about 30 pounds per square inch to raise the buck assembly to the datum position but that a substantially higher pressure is required to move the buck assembly and piston rod above the datum position of FIGURE 23.

In the datum position, shaft 292 bears against the end of slot 287 that is most closely adjacent roller 286 while roller 286 bears against flange 295b. Thus, at this time, parallel arm 279 extends at an angle represented by line X–T of FIGURE 28.

Now the operator holds a pair of pants at the waist portion with the fly area facing the operator and the seat area away from the operator, and lifts upwardly on the pants so that one linkage housing 145, 146 extends into each leg and thence depresses foot switch member 471 to electrically connect terminals 468, 469. This results in solenoid coil 393 being energized whereby a hold-in circuit is provided through switch member 385 and switch member 484 of the timer; and solenoid coil 440 of valve 441 being energized so that the internal connection is broken between ports 535 and 530, and the control port is connected at exhaust muffler 537. As a result there is a sudden drop of pressure in line 544 and thereupon the quick exhaust provides an open passageway from the transfer cylinder 267 to muffler 543. Thereupon, due to the weight of the apparatus supported on the upper end of the piston rod 269, the piston rod begins to descend.

During the downward movement of the piston rod, pivot member 277 moves from position X to position Z while the buck assembly in a vertical condition is moved downwardly, the movement being represented by pivot member 280 moving vertically from point T to point R. During the initial movement of pivot 277 in a downward direction from the datum position, from X toward Z, the roller 286 forces cam member 295 to pivot in the direction of arrow 565 about pivot member 290; the roller at this time moving along surface 295b relative cam 295 in the direction of arrow 567 toward edge 295e adjacent cutout 297 (see FIGURE 24). Due to the angles of inclination of arms 285, 291, the offset of the roller relative the elongated axis of slot 287 (reference line 288 representing the axis of elongation of slot 287 relative cam 295 and roller 286 in the datum position) the relative location of pivots 277, 290, 292, parallel arm is not pivoted, but rather is translated downwardly. As the roller moves into cutout 297, further downward movement of arm 285 results in the slotted portion 287 causing arm 291 to continue to pivot in the same direction whereby shaft 292 moves in the slot relative the arm 285 from the end portion of the slot adjacent roller 286 toward the opposite end portion of the slot. Thus cam arm 291 continues to be angularly moved but arms 279 and 285 are not pivoted. Accordingly as pivot member 277 is moved from position X to position Z, arm 279 is translated from position X–T to position Z–R.

During the time the buck assembly is moving downwardly from its datum position, the operator is holding the pants at the waist line and as a result the leg members of the buck assembly move downwardly into the legs.

It is to be noted that during the initial movement of the buck assembly toward the datum position the switch member of the switches in box 382 are not effected by the rotation of cam 330. However, after a little less than 30° rotation of cam member 330 in the direction of arrow 565, offset 336 allows switch member 368 to break the connection between terminals 366, 367 and connect terminal 367 to terminal 359. After a few degrees further rotation of cam 330, offset 336 is moved angularly relative switch member 368 whereby switch member 368 is moved to again electrically connect terminals 367, 366. The interval of time that offset 366 effectuates movement of switch member 368 between terminals 359, 366 is not sufficient for the switch members of the main relay to change positions.

At about the time switch member 368 has returned to a position to electrically connect terminals 367, 366, switch member 388 has been engaged by cam portion 363 and upon surface 334 being moved closely adjacent thereto, switch member 388 is moved to a closed position to energize coil 389 of valve 390. Energizing coil 389 results in the internal valve member establishing a connection between the control port 517 and inlet port 504, the control port in a valve de-energized condition not being connected to any other port opening through the valve. As a result, air under pressure is applied to the lower end of fly clamp cylinder 246 to move piston rod 245 upwardly. Due to the provision of plates 250, as the piston rod is moved in an upward direction, the fly clamp plates are pivotally swung upwardly and outwardly relative the forward edges of the front wings.

After further rotation of cam 330 in the direction of arrow 565, intermediate portion 334 moves past switch member 388 and as a result switch member 388 resiliently moves to an opened condition to de-energize valve 390. As a result the connection between ports 504, 517 is broken, however, the breaking of this connection does not permit air to exhaust through the valve as the normally provided exhaust port is plugged. Due to air under pressure being in the lower end of the fly clamp cylinder and the spring 252, the fly clamps are retained in a non-clamping condition. Also to be mentioned is that the piston of cylinder 246 has a small orifice provided therein so that air can leak through the piston and exhaust through muffler 529 that is connected to valve 443. As a result when the buck assembly is in its lowermost position sufficient air has leaked out of cylinder 246 whereby manually gripping knob 249, the fly clamps can be moved to a clamping condition and are retained in the clamping condition by spring 252. To be noted is that when the clamp plates are moved between a datum position and a clamping condition, pin 253 is moved across a line between pivot 183, 251 (due to plates 250 being pivoted) and this spring 252 urges the plates 250 to pivot in a direction to move and retain the fly clamps in either the datum position or the clamping condition, depending on which side of said line that pin 253 is located.

At the time the buck assembly is in its lowermost position, the switch members in box 332 are angularly intermediate offset 340 and cam portion 335. Thus the switch members operated by the cam member 330 are in the same condition as they were in at the datum condition of the cam member.

The operator now pulls the pants upwardly on the buck assembly such that the crotch line bears against crotch bracket 601, the lower ends of the legs of the pants are at an elevation above the lower ends of the padding on channels 144, 147, and the upper waist edge of the pants is at an elevation of the cutout 220 of the rear wing plates, and the fly flaps are folded inwardly along the transverse inner surfaces of the front wings to horizontally extend toward the bracket 223. Thence the fly clamp is automatically operated to a closed condition by removing the foot from the foot switch, or before removing the foot from the foot switch, may be manually operated to the closed condition to clamp the upper portions of the pants against the respective front wings and is retained in a clamping condition by spring 252. Sufficient air has leaked through the orifice in the piston of the fly clamp cylinder that it is easily manually operated at this time. At the time that the buck assembly is being moved into the pants, the seat wings are pivotable in the direction of arrow 219 about pivot member 210 against the resilient action of spring 560.

After the pants have been straightened on the buck assembly and the fly clamps manually operated to a clamping position, the foot is removed from the foot switch whereupon switch member 471 is resiliently returned to electrically connect terminals 468, 445. This results in the solenoid coil 444 of valve 443 being energized whereupon the connection of control port 515 to exhaust port 526 is broken and a connection is established to the inlet port 527 to apply air under pressure to the forward ends of cylinders 242, 242 and 521, and to the upper ends of cylinders 167 and to 246. Air under pressure is now applied to the top of the fly clamp cylinder 246 to move the fly clamp to its clamped position and retain it in said position, or if it has been manually operated to a closed position to retain the fly clamps in a clamped condition, and air under pressure is applied to piston cylinder combination 521 to urge the seat wings to pivot relative the rear wing plates in the direction opposite arrow 219.

It is to be noted that at the time the buck assembly is in a datum condition and up to including the time coil 444 is energized, air under pressure is being applied through valve 477 to the lower end of cylinder 167 and to the rear ends of cylinders 242, which opposes the movement of air under pressure being applied from control port 515 to the opposite ends of said cylinders. However, since the piston rods of these cylinders are of a substantial diameter, for example, one inch, the area of the surfaces of the pistons of cylinders 167, 242, 242 that air under pressure acts against, i.e. the lower surface of the piston of cylinder 167 and the rear surfaces of the pistons of cylinders 242, is substantially less than the area that air acts against on the opposite side of the respective piston. As a result, the piston rod of cylinder 167 is moved downwardly through arms 161 to move pivot arm 158 in the direction of arrow 574 about pivot members 159 and thereby move pivot member 157 in the same direction. Due to the provision of the link 163, as pivot member 157 is moved in the direction of arrow 574, pivot member 155 is moved in the direction of arrow 575 to move the lower end portions of the rear wings to an extended condition. At the same tme that the lower end portions of the rear wings are being moved in the direction of arrow 575, the piston rods 243 are being moved generally in the direction of arrow 576 whereby pivot member 199 moves bars 191 in the same direction. This causes control links 188 to pivot in the direction of arrow 577 about pivot member 190, and since bars 182 are located on the opposite side of said pivot member from the connection of control link 188 to bars 191, bars 182 are moved generally in the direction of arrow 578. Accordingly, the upper portions of the front and rear wings are simultaneously moved in opposite directions to a wing expanded condition.

As the front wings are moved to an extended condition, the pivot member 183 is generally moved through a slightly curved path having a radius of curvature from pivot 151. The rear wing pivots 155, 199 are moved outwardly (arrow 576) about the same amounts and through corresponding curved paths of movement which are primarily longitudinally outwardly and a slight amount downwardly. Thus the spacing between pivots 155, 199 remain substantially the same as the rear wing plates are moved between a retracted and an extended position.

Relative the rear wing plates moving to an extended condition, only a small relative force urges the seat wings to the condition of FIGURE 5. Accordingly, if a relatively narrow waist pair of pants is being pressed, the seat wings would not be moved to the fully extended condition relative said plates such as illustrated in FIGURE 5 but may actually pivot in the direction of arrow 219 relative said plates. Further, with or without air under pressure opposing the aforementioned movement of the piston rods to extend the wings, the movement of the wings to extended condition will be limited by the girth of the lower pants legs and the waist of the pants, there being insufficient forces causing the movement o fthe wings to cause tearing of the pants.

After the seat and leg wings move to an extended condition, the two hand switches 414 on the front control box 580 are depressed, said box being mounted on panel 318. This completes a circuit to energized solenoid coil 417 of transfer relay 418, switch member 435 thereupon being moved to the closed condition providing a holdin circuit for said solenoid coil. Energizing relay 418 opens switch member 438 to thereby de-energize coil 440 whereupon the connection between control port 535 and the exhaust muffler 537 is broken and the control port is connected to the inlet port. As a result the quick exhaust 542 operates to break the fluid connection between lines 545, 446 and establishes a fluid connection between lines 544, 545 to apply said air under regulated pressure to the transfer cylinder.

Switch member 435 in moving to a closed condition (also switches 414 in a closed condition) provides a circuit to energize coil 493 whereby the internal valve member of valve 494 establishes fluid communication between ports 540, 541 so that air under pressure is applied to transfer cylinder at a pressure substantially higher than that available from valve 441. Accordingly, the piston rod 269 moves pivot member 277 unpwardly along line Z–X–V. As the pivot member 277 is moved between elevations Z and X, the arm 279 is translated from position Z–R to position X–T; and as the pivot member 277 is moved adjacent the X position, roller 286 and cam member 295 have been moved relative one another that the roller is moved into engagement with the inner peripheral surface of flange 295 at 295e.

During the interval of time arm 279 is moved from position Z–R to position X–T, cam member 330 is rotated in a direction opposite arrow 565, and accordingly, during this interval switch 388 is closed for a short period of time during which valve 390 is energized to apply air under pressure to the lower end of cylinder 246. However, since the air pressure on the underside of the piston of cylinder 246 is the same as that on the upper side but the effective area on the lower side of the piston is substantially smaller, piston rod 245 does not move. Also through the rotation of cam member 330, switch member 368 when it is adjacent offset 336 momentarily moves to electrically connect terminals 359 and 367 and thence to re-establish connection between terminals 366, 367. However, this does not affect the operation of the controls for reasons set forth relative the movement of cam 330 in the direction of arrow 565.

As pivot 277 is moved from position X to position V, roller 286 moves on flange 295 and relative thereto in a direction opposite arrow 567 toward edge 295d and shaft 292 abuts against the end of slot 287 that is adjacent said roller whereby through arm 285 and the vertical movement of pivot 277, arm 279 is moved both vertically upwardly and swung in the direction opposite arrow 566 from position X–T to position V–U whereby pivot member 280 is moved through path M. During this interval of time, cam member 330 is rotated to first bring tab 337 into engagement with switch member 368 and as said switch member moves adjacent notch 339, the switch member electrically connects terminals 359, 367. During the interval of time terminals 359, 367 are connected, tab 325 moves into engagement with switch member 412 whereby switch member 412 moves to an opened condition. As a result relay 418 is de-energized to break the holdin circuit through switch member 435 and to de-energize coil 493 of valve 494 and to energize valve 441. Coil 493 is de-energized at the time linkage 279 is almost at position V–U, i.e. adjacent the position piston rod 269 is at the fully extended condition, arm 279 extending vertically above the piston rod, and cam member 330 having rotated such that reference line 331 also extends vertically. At the time reference line 331 extends vertically, switch member 368 has been moved by tab 338 to electrically connect terminals 366, 367 and arm 279 extends vertically at V–U. Due to energizing valve 441, the pressure in line 544 is decreased and thereupon the quick exhaust fluidly connects line 554 to line 546 to exhaust the cylinder. Piston rod 269 begins to move in a downward direction toward the position X and thence to position Z. However, in part due to inertia and the fact that the cam follower is riding on the inner peripheral surface of flange 295b opposite cutout 297, the buck assembly continues to be pivotally swung about pivot 277 in the direction opposite arrow 566.

As roller 286 continues to move relative flange 295b in a direction opposite arrow 567 (towards the edge of the flange 295e), the pivot member 280 is swung through path K from position U to position Q. At about position Q, the roller rolls off the edge of flange 295 at 295d and thence shaft 292 moves through slot 287 in the direction toward pivot 277. As a result as the transfer cylinder piston rod moves pivot 277 from elevation X to Z, arm 279 is translated from position Q–X to position P–Z. It is to be noted that arm 279 at position P–Z is at a substantially smaller angle of inclination relative the horizontal than at position Z–R. Accordingly the buck assembly extends to a lower elevation at the pressing station than it does at the operator station.

As the buck assembly moves downwardly and rearwardly along path K, tab 329 forces switch member 412 to move to a closed position, however, this does not affect the present stage of energization of the various relays since the transfer relay is already de-energized. As the buck assembly is moved downwardly along path K, one of the leg members of the assembly is moved downwardly between presser heads 21, 24 while the other leg member is moved downwardly between presser heads 22 and 24.

At the time the buck assembly is in its lowermost position at the pressing station, the crotch bracket 601 has its generally planar intermediate portion located a fraction of an inch above surface 53, the forward hooked portion closely adjacent surfaces 54 and 71c, and its rearward hooked portion closely adjacent surface 52 so that crotch bracket is directly vertically above said surfaces other than surface 71c. Also the rear seat seam is located closely adjacent the apex of surfaces 52, 51 while the waist band is at an elevation below surface 50. Further the tapered surfaces 216a, 216a are closely adjacent presser head surfaces 61, 63; and front wing tapered surfaces at 212c, 212c closely adjacent presser head surfaces 66, 67.

At the time the piston rod 269 is moved to its lowermost position, transfer block 276 abuts against a shock absorber 262 and cam 330 is rotated to an angular position to bring offset 340 into abutting relationship with end switch member 475 to move the end switch member to electrically connect the terminals 472, 473. Upon closing the end switch, the timer motor 481 is energized to start the timer cycle. Further, solenoid coil 476 is energized to connect control port 505 to exhaust port 506 to begin exhausting the air under pressure from the rearward ends of cylinders 242, 242 and lower end of cylinder 167. However, the rate of exhaust is relatively slow due to the provision of relief valve 507, and the relief valve discontinues exhausting of air when the pressure has fallen to a given level. As a result of the gradual reduction of air under pressure in said cylinders, the front and rear wing plates are given a final expansion squeeze which is just prior to the presser heads 21, 22 being moved to forward a closed pressing condition.

At the same time solenoid coil 476 is energized, solenoid coil 478 is energized to connect control port 520 to inlet port 503. This applies air under pressure to the lower ends of cylinders 73, 122 and 122 to move their respective piston rods in an upward direction. Applying air under pressure to cylinder 73 swings the fly presser head 71 in an upward and rearward direction from the dotted line position of FIGURE 4 to the solid line position. Due to flow controls 519, 519, 533, the fly head moves to its pressing condition prior to presser heads 21, 22 being moved to a closed condition, even though air is applied from the same junction to cylinders 73, 122, 122. As the fly head is moved to the fully closed position, resilient pads 69 are squeezed to cause them to bulge transversely outwardly a slight distance, the movable presser heads then moving to a fully closed pressing condition and acting through the front wing plate pads to compress pads 69 in a transverse direction sufficiently such that their surfaces are even with the pressing surfaces of presser heads 24, 71. This avoids or minimizes the sharpness of any pressing line at this location which would result if the pads 69 were not provided.

Applying air under pressure to the lower ends of cylinders 122, 122 moves the cam members 120 about their pivot members 119 to force the movable presser heads 21, 22 upwardly transversely inwardly toward the stationary presser head. Due to the provision of the linkages connected to the movable presser heads and springs 134, the lower end portions of the presser heads engage the buck assembly and thence when the lower portions cannot move more closely transversely adjacent the longitudinal axis, and the continued movement of the cams 120 result in the movable presser heads pivoting about pivot members 115 such that the upper end portions of said heads move more closely adjacent the longitudinal axis. At the same time the upward and transversely inward pivotal movement of the rollers 130 forces the movable presser heads into firm pressing engagement with the lower portions of the leg members of the buck assembly.

It is to be noted that as cams 120 are initially moved from the datum position, the movement of arms 113 about their respective pivots 112 permits switch member 490 resiliently moving to a position breaking the electrical connection between terminals 402, 489 and electrically connecting terminals 400, 402, and switch member 491 moving to an opened condition. Further, as the fly head is moved from its datum condition, the fly head linkage moves away from switch member 492 whereby it resiliently moves to an open condition. Valve 494 cannot be energized as long as either one of switch member 491, 492 are open; nor can said valve be energized as long as, at the same time, the transfer relay is energized and presser head 21 is away from its datum condition.

At the end of the timing cycle of timer motor 481, switch member 484 breaks the electrical connection between terminals 394, 483 and electrically connects terminals 482, 483; and a short time thereafter again makes an electrical connection between terminals 394, 483. When the electrical connection between terminals 394, 483 is broken, solenoid coil 393 of the main relay 317 is de-energized which results in the holdin circuit through switch member 385 being broken. Switch member 385 being in open condition also results in valves 477, 479 being de-energized. At the same time switch member 385 moves to an open condition, switch member 399 moves to a closed condition to, through switches 401, 408, energize the transfer relay, switch member 435 thereby moving to a closed condition to provide a holdin circuit to maintain the transfer relay in an energized condition even though switch member 490 thereafter moves to electrically connect terminals 402, 489.

De-energizing valve 479 results in cylinders 122, 73, 122 being fluidly connected to exhaust 524 whereupon the fly head and presser heads 21, 22 move toward an open datum condition. Upon presser head 21 moving closely adjacent its datum position, head limit switch member 490 is moved to connect terminals 402, 489, the transfer relay holdin circuit having been closed by this time. When presser head 22 and fly head 71 are closely adjacent their datum positions, limit switches 491 and 492 are closed.

De-energizing valve 477 results in air under pressure being applied to the rearward ends of cylinders 242, 242 and the lower end of cylinder 167 to through the connecting linkages decrease the transversely opposing forces applied through the wings to the seat and legs of the pants, i.e. partially offset the forces retaining the wings in an expanded condition.

The transfer relay in being energized moves switch member 438 to an open condition to de-energize valve 440; and upon presser heads 21, 22, 24 moving substantially to a datum position, switch members 490, 491, 492 provide a closed circuit from junction 403 through coil 493 to energize valve 494 and thereby apply air under pressure to the lower end of the transfer cylinder.

As the transfer piston cylinder rod moves upwardly, cam 330 is rotated in the direction of arrow 565 whereupon end offset 340 moves out of contact with end switch member 475, and said switch member moves to an open condition to prevent the timer motor being energized until the next cycle. As piston rod 269 moves upwardly, parallel arm 279 is translated from position P–Z to position Q–X and roller 286 is moved into abutting engagement with the edge 295d of flange 295b. Thereafter cam follower 286 is moved relative the flange 295b in the direction of arrow 567 whereupon pivot member 280 is moved in an upwardly and forwardly direction along path K.

As pivot 280 is moved along path K toward position U, cam 330 is moved to bring tab 329 into abutting relation with switch member 412 and said switch member is resiliently moved to an open condition. This de-energizes transfer relay 418 whereupon switch member 435 moves to an opened condition to denergize valve 494. As a result, air under pressure is no longer applied through ports 540, 541, but piston rod 269 continues to move in an upward direction for a short distance. Deenergizing relay 418 results in switch member 432 moving to an opened condition and as a result valve 443 is de-energized to connect the upper ends of cylinders 167, 246 and the forward ends of cylinders 242, 242 and 521 to the exhaust. Since air under pressure is being applied to the opposite ends of cylinders 167, 242, 242 (due to valve 477 being energized) the wing plates are moved to a retracted condition of FIGURE 23 but the fly clamp piston rod 245 more slowly moves to an upward condition due to the provision of the flow control valve 516 and the slow leak due to the orifice provided in a piston of the fly clamp piston cylinder combination. Even though air is exhausted from the piston cylinder combination 521, the spring 560 through members 554–557, 558 retains the seat wings in their expanded condition; or depending on the waist dimensions, moves the seat wings in a direction opposite arrow 219 as the rear wings are moved to a retracted condition.

As cam 330 continues to rotate in the direction of arrow 565, tab 338 is moved into engagement with switch member 368 of the neutral switch whereupon its switch member is moved to connect terminals 359, 367, this occurring while switch member 412 is open. Since the transfer relay 418 is de-energized, valve 441 is energized to fluidly connect junction 539 to muffler 537 and as a result the transfer cylinder exhausts through the quick exhaust and muffler 543. At this time arm 279 is moved to the closely adjacent position V–U and thence pivot 277 is again moved downwardly from position V toward position X.

During the time valve 441 is energized, the cancel relay 370 also is energized to move switch member 421 to an open condition, and provides a circuit through switch member 424 that energizes valve 443. Valve 443 applies air under pressure to cylinders 167, 242, 242, 521 that moves the wings toward an expanded condition and to the upper end of cylinder 246. However, the cancel relay is de-energized and the last mentioned cylinders are again connected to the exhaust 529 after tab 337 moves the neutral switch to position to connect terminals 366, 367. Prior to neutral switch member 368 engaging tab 337, tab 325 is rotated to position to close center switch member 412, but the transfer relay cannot now be energized as switch member 421 is open.

At closely adjacent position X for pivot 277 (position X–T for arm 279), switch member 368 has engaged tab 337 to break the electrical connection between treminals 359, 367 whereupon valve 441 is de-energized. As a result air under pressure from junction 528 passes through regulator 531, valve 441 and the quick exhaust to the transfer cylinder 267 to obtain and maintain a sufficient pressure in the transfer cylinder that the buck assembly stops at its datum position. At the time the buck assembly is moved to its datum position, sufficient air has leaked past the piston of cylinder 246 to exhaust outwardly through the line connected to the upper end of the cylinder and to exhaust 529 whereby the fly clamp is retained in a closed position by substantially only spring 254 being in an "overcenter" position. At this time the operator gives a slight tug on the legs of the pants and the pants are removed from the buck assembly.

A bracket and resilient member 268 on each of arms 279, 281 has the resilient member bearing against the other arm to respectively limit the pivotal movement of the arms relative the transfer block at positions Q–X and X–T.

If for some reason it is desired to immediately return the pressing machine to the datum condition, irrespective of the position of the operating cycle, the switch member 363 of the cancel switch 366 is depressed. The switch 366 is located on panel 580.

On manually depressing switch member 363, the electrical connection between terminals 355 and 358 are broken and an electrical connection is made between terminals 357, 355. If the electrical connection is made between terminals 357, 355 at the time the movable presser head and fly head are in a datum condition, the main transfer relay, if energized, is deenergized and valve 494 is energized to apply air under pressure to raise the transfer cylinder piston rod and move arm 279 toward position X–T, the transfer cylinder returning arm 279 to position X–T and maintaining it in said position after the manual pressure on cancel switch 363 is released. In any event the movable presser heads and fly head are in a pressing condition (relay 418 being energized), main relay 371, if energized, will be de-energized as will valves 477, 479 and 443. As a result, presser heads 21, 22 and the fly head move to their datum condition and upon moving to said condition, provide a circuit to energize valve 494 to thereby apply air under pressure to the transfer cylinder to raise the transfer piston rod, and upon allowing the cancel switch to connect terminals 355, 358, arm 279 is moved to position X–T. It is to be noted that upon depressing the cancel switch with the movable presser heads and fly head in closed condition there is provided a circuit to energize the transfer relay 418, provided the cancel relay is de-energized. However, the only time the cancel relay can be energized is when the main relay 371 is de-energized, and accordingly the neutral switch 368 must be in a position connecting terminals 359, 367. Further, the only time neutral switch is in this position is for a short time when its switch member is adjacent offset 336, and in the area angularly between tabs 337 and 399.

The pads 170 on channel 144 extends more than the entire length of the usual outside seam of a pair of pants and bears against the outside seam portions of pants dressed on the buck assembly. Likewise the transverse inner pads 171 on channels bear against the inside seam portions of the pants, i.e. extends from the lowermost elevation of the crotch seam to an elevation below the lower ends of the legs of the pants. Further the cuffs, if any, are transverse adjacent the resilient pads on the stationary presser head when the buck assembly is at the pressing station while the portions of the cuffs longitudinally between said resilient pads bears against pads 170 or 171. The seat wing pads and front wing pads are located to have the pocket and fly area portions bear thereagainst. Thus there are provided pads in areas (other than at the crotch seam) in which multiple layers of cloth are located between a presser head and a wing plate to prevent overpressing in these areas while the apparatus of this invention provides sufficient pressing action in other areas of the pants. However, the wing plates do not have any padding thereon at the lower and intermediate portions thereof, and thus sharp front and rear creases are obtained in the legs of the pants.

Also it is to be mentioned that in a pressing condition, with various size pants the fly areas extend rearwardly along side the pressing surfaces of presser head 71 different distances. Further the seat wings move relative the rear wing plates different amounts with different size and shape pants. Thus the apparatus of this invention may be utilized for pressing pants of various lengths, tapers, and girths.

Not specifically mentioned, is that the buck assembly is stopped in the neutral position to make for easier unloading of said assembly, then if the buck assembly were directly moved to its lowermost position at the operator station. Providing for the buck assembly moving downwardly from the neutral position makes it easier to dress the pants on said assembly than if the buck assembly was stationary either at the elevation of the neutral position or its lowermost position at the operator station.

Although the term "pants" has been used in the specification and claims, it is to be understood that in place of said term "trousers" may be substituted for said term.

What we claim is:

1. Pants pressing apparatus having a pressing station, an operator station and a longitudinal axis extending through said stations for pressing a garment having tubular portions, comprising a frame, a vertically elongated stationary presser head having a first set of pressing surfaces on one transverse side of said axis and a second set of pressing surfaces on the opposite transverse side of said axis, at least some of the aforementioned pressing surfaces of each set being inclined upwardly in a direction toward said axis, said stationary presser head having at least two of its surfaces for abutting against a substantial area of the torso portion of a pair of pants, a pants buck assembly having a pair of vertically elongated members extendable into torso portion and the tubular portions of the pants, means on said elongated members for drawing the tubular portions taut and retaining pants on said members, and first means for mounting said members in depending relationship relative thereto, transfer means on the frame and connected to the first means for moving the first means between a position at the operator station and a position at the pressing station that the elongated member extends along opposite sets of pressing surfaces, a movable presser head on either transverse side of said stationary presser head, and means on the frame and connected to the movable presser heads for moving each movable presser head from a datum position transversely spaced from the respective set of pressing surfaces and a position adjacent thereto, and control means for operating the pants retaining means to retain pants on said elongated members, then the transfer means transferring the buck assembly from the operator station to the pressing station, and thereafter the movable presser heads from their datum positions to positions adjacent the stationary presser head in cooperation with the stationary presser head to press the tubular portions and a torso portion of the pants dressed on said elongated members.

2. Apparatus for pressing a pair of pants having a torso portion and legs joined to said torso portion comprising a frame having a longitudinal axis, a stationary presser head mounted on said frame and having pressing surfaces on either transverse side of said longitudinal axis generally inclined upwardly and inwardly toward said axis, said stationary presser head having a main body portion that includes some of the aforementioned pressing surfaces on either side of said axis and an upper portion joined at its lower end to said main body portion that includes at least portions of said pressing surfaces, said upper portion having an edge portion that is curved downwardly in a forward longitudinal direction, said upper portion having a substantially smaller longitudinal dimension than the main body portion, a fly head having pressing surfaces on either side of said longitudinal axis, means on the stationary head for mounting the fly head for limited movement between a datum position and a second position that the fly head surfaces at least in part form a continuation of main body pressing surfaces and are substantially longitudinally forwardly of the curved edge portion of the upper portion, a first movable presser head on one transverse side of the stationary presser head and a second movable presser head on the other transverse side of the stationary presser head, means mounted on the frame for moving the movable presser heads from datum positions transversely spaced from said stationary presser head to pressing positions closely adjacent the respective sides of the stationary presser head and the fly head in a pressing condition, a buck assembly for having pants dressed thereon and retaining the pants in a generally taut condition from adjacent the top of the pants to adjacent the bottom of the pants with the pant legs diverging outwardly in a downward direction, means mounted on the frame for moving the buck assembly between a datum position and a pressing position that the fly areas of the pants are on transverse opposite sides of the fly head, the legs are on opposite transverse sides of the main body portion and the seat area of the pants extends along opposite transverse sides of said upper portion, and first means for operating the buck assembly moving means and the movable presser head moving means to move the buck assembly into a pressing condition relative the stationary head and thereafter move the fly head to its second position and the movable presser heads from their datum positions toward the stationary presser head to bring the movable presser heads into pressing engagement with the pants on the buck assembly and force the buck assembly into pants-pressing relationship with the stationary presser head.

3. The apparatus of claim 2 further characterized in that the fly head moving means includes a piston cylinder combination on the frame and having a piston rod, first linkage means connecting the piston rod to the fly head for moving the fly head as the piston cylinder combination is operated, and second linkage means connecting the first linkage means to the stationary presser head for controlling the path of movement of the first linkage means and thereby the fly head as the first linkage means is moved.

4. The apparatus of claim 2 further characterized in that the main body portion and the fly head in its second position have cooperating surface portions that form a close fit and are inclined downwardly in a forwardly direction, and that the fly head moving means includes a piston cylinder combination having a piston rod and means operatively connecting the piston rod to the fly head for swinging the fly head upwardly and rearwardly from the fly head datum position to the fly head second position.

5. The apparatus of claim 4 further characterized in that the main body cooperating surface portion includes a resilient pad forming a portion of each pressing surface of the stationary presser and means mounting the resilient pads in position to be compressed as the fly head is moved to its second position.

6. The apparatus of claim 4 further characterized in that the first operating means includes second operating means for operating said piston cylinder combination and the movable presser head moving means to move the fly head to its second position prior to the movable presser heads being moved to their pressing position.

7. The apparatus of claim 6 further characterized in that the first operating means includes third operating means for moving the buck assembly between the datum position and its pressing position and control means for actuating the second operating means to move the fly head to its second position and the movable presser heads to their pressing positions respectively only after the buck assembly has been moved to its pressing position.

8. The apparatus of claim 7 further characterized in that the buck assembly includes a pair of transversely spaced front wing plates and a pair of transversely spaced rear wing plates, means for mounting and moving the front and rear wing plates relative to one another between extended and retracted conditions, each rear wing plate having an upper portion, a seat wing for each rear wing plate movably connected to the respective rear wing plate upper portions to permit the seat wings moving relative the rear wing plates between an extended and a retracted condition relative the front wing plates and means connected to the front and rear wing plate mounting means for resiliently urging the seat wings to an extended condition relative the front wing plates.

9. The apparatus of claim 8 further characterized in that the resiliently urging means includes a piston cylinder combination mounted on the front and rear wing plate mounting means for moving the seat wings to an extended condition relative the rear wing plates, and that the control means includes means for operating the seat wings to an extended condition and the front and rear wing plate operating means to move the front and rear wing plates to an extended condition at about the same time the seat wings are operated to an extended condition.

10. Garment pressing apparatus having a pressing station, an operator station and a longitudinal axis extending through said stations for pressing a pair of pants having a torso portion and leg portions, comprising a frame, a vertically elongated stationary presser having a first set of pressing surfaces and a second set of pressing surfaces on the respective transverse side thereof, each set of pressing surfaces being generally upwardly inclined in a direction toward said longitudinal axis, each set of pressing surfaces including a first longitudinally intermediate, vertically elongated recessed pressing surface, generally planar second pressing surfaces longitudinally on either side of said first pressing surface that extend from adjacent the lower end of the stationary presser head to a substantial distance thereabove, third pressing surfaces longitudinally on either side of the first pressing surface that intersect the respective second pressing surface and are inclined at a substantially smaller angle than the second pressing surface, and generally planar fourth pressing surfaces on either longitudinal side of said first pressing surface that are inclined at about the same angle as the second pressing surfaces and intersect the respective third pressing surfaces at a higher elevation than the intersection of the second and third pressing surfaces, a pants buck assembly having downwardly diverging, vertically elongated support members, a front wing member and a rear wing member for each support member and mounted thereon to respectively extend longitudinally forwardly and rearwardly of the respective support member, the maximum thickness of said wing members being less in a transverse direction than the maximum width thereof in a longitudinal direction, each support member having a padded surface portion of a size and shape to form a close pressing fit with the respective first pressing surface, each front wing member having lower, intermediate and upper pressing surface portions that respectively form a close pressing fit with the transversely adjacent second, third and fourth pressing surfaces of the stationary presser head on one longitudinal side of said recessed pressing surfaces when the buck assembly is in a pressing condition, and each rear wing member having lower, intermediate and upper pressing surface portions that respectively form a close pressing fit with the respectively adjacent areas of the second, third and fourth pressing surfaces of the stationary presser head on the other longitudinal side of said recessed pressing surfaces when the buck assembly is in a pressing position, means for transferring the buck assembly from the operator station to a pressing position so that the abovementioned buck assembly surface portions are adjacent the respective stationary presser head pressing surfaces, a movable presser head on either transfer side of the stationary presser head, and means mounted on the frame and connected to the movable presser heads for moving the movable presser heads from datum positions substantially spaced from the stationary presser head to positions to force the buck assembly pressing surface portions into pressing relationship with the transversely adjacent stationary presser head pressing surfaces.

11. The apparatus of claim 10 further characterized in that said stationary presser head has an upper portion extending to a substantially higher elevation than said recessed pressing surfaces and longitudinally rearwardly thereof, said upper presser head portion having said fourth pressing surfaces that extend longitudinally rearwardly of said recessed pressing surfaces, and that there is provided a fly head and means mounted on the frame and connected to the stationary presser head for moving the fly head between a datum position and a pressing position rearwardly of said datum position after the buck assembly has been moved to the pressing position, said fly head in its pressing position having transversely opposed pressing surfaces that are inclined upwardly toward the longitudinal axis and at least in part respectively form continuations of the fourth pressing surfaces that are longitudinally opposite said upper presser head portion, said fly head in a datum position having a generally vertically extending rearward edge that is a substantial distance longitudinally forwardly of said upper presser head portion.

12. The apparatus of claim 11 further characterized in that said rear wing members each includes a vertically elongated rear wing plate having an upper portion and a lower portion, a vertically elongated seat wing having padding thereon of a substantially greater transverse thickness than the rear wing plate, and means for mountingly attaching the seat wing to the rear wing plate upper portion on one side thereof for limited retracted and expanded movement relative thereto in an expanded condition less completely overlap the rear wing plate than in said retracted condition, said seat wings comprising the aforementioned upper and intermediate surface portions of said rear wing members and being mounted on the adjacent sides of said rear wing plates.

13. The apparatus of claim 11 further characterized in that said front wing members each includes a vertically elongated front wing plate having an upper portion and a lower portion and padding mounted on either transverse side of the upper portion of the front wing plate, said padding on either side of the front wing plate being of a substantially greater thickness than the front wing plate, said padding at least in part comprising a substantial portion of said front wing upper and intermediate pressing surface portions.

14. The apparatus of claim 11 further characterized in that each support member has transversely spaced front and rear edge portions, and that each wing member is mounted on the respective support member by means attached to the support members for moving the front and rear wing members between retracted positions at least partially between the front and rear edge portions respectively of the respective support member and an expanded condition that at least the wing members upper surface portions extend substantially more longitudinally remote from the support members than in the retracted positions, the maximum transverse thickness of each support member being substantially greater than the maximum transverse thickness of said wing members.

15. The apparatus of claim 11 further characterized in that said wing members have upper and lower end portions and are relatively thin in a transverse direction and that at least one of the wing members is mounted on the respective support member by means attached to the last mentioned support member and connected to the upper portion of said one wing member for resiliently urging said one wing member in an upward direction, an eccentric member having a cylindrical portion pivotally mounted in the lower portion of said one wing member and non-circular axial projections joined to said cylindrical portion in eccentric relation to the central axis of said cylindrical portion, and means having generally keyhole shaped slots for connecting said eccentric member to the support member while permitting adjustably pivoting said eccentric member to adjust the tension in said one wing, said keyhole slots each having a lower cylindrical part of a size to permit said cylindrical portion to be inserted therethrough and an upper part of a size and shape to permit a projection being moved thereinto and while the projection is therein to prevent any substantial pivotal movement of the projection.

16. In garment pressing apparatus for transferring a vertically elongated buck assembly from an operator station forwardly of the presser heads to a pressing position between said presser heads, a frame, a transfer block, means mounted on the frame for mounting said block longitudinally between the presser heads and the operator station and translating said block between a first elevation and a second, higher elevation, first means mounting the buck assembly on the transfer block for pivotal movement from the operator station to the pressing position, said first means including a transverse pivot member pivotally mounted on the transfer block, an elongated arm having one end portion attached to said pivot member to pivot therewith and a second end portion pivotally connected to said buck assembly, an upright mounted on said frame, second means at least in part mounted by said upright and connected to said pivot member for rotating said pivot member and the arm connected thereto to swing the buck assembly from the operator station in a direction upwardly and rearwardly as the transfer block is moved toward and to said second elevation, and thereafter swinging said buck assembly downwardly and rearwardly toward said pressing position as the transfer block is moved from said second elevation toward said first elevation, and control means for operating the transfer block moving means to move the transfer block from said first elevation to said second elevation and thereafter automatically move said transfer block to said first elevation.

17. The apparatus of claim 16 further characterized in that the abovementioned arm extends generally away from the pivot member in one direction and that the second means includes an elongated control arm means having one end portion attached to said pivot member to rotate therewith and extend radially away from said pivot member in a direction that is at a substantial angle to the direction of extension of the first mentioned arm, and elongated third means having one end portion pivotally connected to said upright and an opposite end portion in operative engagement with the control arm means for pivotally moving said control arm means as the transfer block is moved to rotate said pivot member to swing said arm and the buck assembly in the aforementioned manner.

18. The apparatus of claim 17 further characterized in that said transfer block moving means comprises an upright piston cylinder combination having a cylinder mounted on said frame and a piston rod attached to said transfer block, and that said first means includes a second arm mounted in parallel relationship to the first mentioned arm and has one end portion pivotally connected to the buck assembly in spaced relation to the pivotal connection of the first mentioned arm to said assembly and a second end portion pivotally connected to said transfer block.

19. The apparatus of claim 17 further characterized in that said transfer block moving means is operable to move said transfer block to a third elevation substantially lower than said first elevation, that said control arm means comprises an elongated control arm having a first end portion attached to said pivot member, a second end portion, and a slot intermediate the first and second end portions that is elongated in the same direction as the elongation of said control arm, and that the third means includes a transverse shaft riding in said slot and fourth means mounting said shaft for movement in said slot from adjacent said first end portion to adjacent said second end portion as the transfer block is moved from the third elevation to the first elevation and from adjacent the second end portion to the first end portion as the transfer block is moved from the first elevation to the third elevation to permit the control arm being translated as the transfer block is moved between the first and third elevations thereby the buck assembly is translated as the transfer block moves between said first and third elevations.

20. The apparatus of claim 19 further characterized in that the control arm means includes a transversely extending cam follower mounted on the second end portion of the control arm, and that the fourth means comprises a cam, and a cam arm having one end joined to said cam and an opposite end pivotally connected to said upright, said cam having an arcuately curved transverse flange for said roller to ride on, and a cutout opening to said flange in a direction opposite the extension of said cam arm for the roller to enter into engagement with said flange as the transfer block is moved from the third elevation to the first elevation and to move out of engagement with and to a position remotely spaced from said cam as the transfer block is moved from the first elevation to the third elevation.

21. The apparatus of claim 20 further characterized in that said presser heads comprise a stationary presser head mounted on the frame that has a plurality of sets of pressing surfaces on either side of said longitudinal axis that are inclined generally upwardly and inwardly toward the longitudinal axis, a movable presser head on each transverse side of the stationary presser head, and means for moving the movable presser heads from datum position substantially transversely spaced from the stationary presser head and pressing positions abutting against the buck assembly in its pressing position, said buck assembly in its pressing position having a vertical elongated member extending between each movable presser head and the respective transversely adjacent pressing surfaces, and that said control means includes a switch member cam secured to said cam arm adjacent the upright to pivot about the pivotal connection of the cam arm to the upright, a plurality of switches operated by the movement of the switch member cam, and electrical and pneumatic control circuit means actuated by said switches to sequence the actuation of the transfer block moving means and the movable presser head moving means to move the buck assembly from the operator's station to its pressing position and thereafter the movable presser heads to their pressing positions.

22. Garment pressing apparatus having a pressing station, an operator's station forwardly of said pressing station and a longitudinal axis extending through said stations comprising a frame, a buck assembly for having a garment dressed thereon and retaining portions of the garment to be pressed in a generally taut condition, said buck assembly being movable from the operator's station to a pressing station, a plurality of presser heads on the frame, there being at least one presser head that is movable relative another presser head between a datum position and a pressing position to in coöperation with the buck assembly in its pressing position press the garment dressed on the buck assembly, means mounted on the frame for relatively moving the presser heads between their datum and pressing positions, transfer means mounted on the frame for translating the buck assembly vertically downwardly from a datum position at the operator's station to a lowered position to have a garment dressed on said assembly, then translating the buck assembly vertically upwardly to its datum position, thence simultaneously moving the buck assembly upwardly and swinging the buck assembly first rearwardly through an arc and next downwardly and through an arc further downwardly, and thereafter translate the buck assembly downwardly to its pressing position, and control means for operating the transfer means to move the buck assembly from its datum position to its lowered position, and thereafter the buck assembly to its pressing position, and after the buck assembly is in its pressing position, operating the presser head moving means to relatively move the presser heads from the datum to the pressing position.

23. The apparatus of claim 22 further characterized in that said presser heads include a stationary presser head mounted on the frame and having pressing surfaces on either transverse side of said longitudinal axis that are generally inclined upwardly toward the longitudinal axis, that said buck assembly is of a size and shape to have a pair of pants dressed thereon, said buck assembly including a vertically elongated leg member having pressing surfaces on either side of said longitudinal axis for being extended into the respective leg of said pants, and drawing and retaining the leg taut, that said transfer means in swinging the buck assembly rearwardly and downwardly moves the buck assembly to position one leg member along the pressing surfaces of each transverse side of the stationary presser, said presser heads also including a movable presser head on the frame on either transverse side of the stationary presser head and movable between a datum position remote from the stationary presser head to a position adjacent the stationary presser head to in cooperation with the stationary presser head press the pants on said buck assembly.

24. The apparatus of claim 23 further characterized in that the transfer means includes a transfer member longitudinally intermediate the pressing station and the loading station, first means mounted on the frame and connected to the transfer member for vertically translating the transfer member between a datum elevation, a second elevation at a lower elevation lower than the datum elevation, and a third elevation higher than the datum elevation, and second means at least in part mounted on the transfer member for mounting the buck assembly and swinging the buck assembly through an arc relative the transfer member between a position longitudinally forwardly of the transfer member to a position longitudinally rearwardly of the transfer member as the transfer member moves from said datum elevation to said third elevation and thence returns to said datum elevation, and that said control means includes third means for operating the transfer member moving means to move the transfer member when the buck assembly is forwardly of the transfer member from the datum elevation to the second elevation and retain the transfer member at the second elevation, and thereafter selectively operate the transfer member moving means to automatically move the transfer member from said second elevation through said datum elevation to said third elevation and then from said third elevation through said datum elevation to said second elevation whereby the buck assembly is moved from said operator station to the buck assembly pressing position.

25. The apparatus of claim 24 further characterized in that said second means includes a pivot member pivotally mounted by said transfer member, an elongated arm having one end pivotally connected to the pivot member and an opposite end pivotally connected to the upper portion of said buck assembly, and means connected to the frame and to the pivot member for pivoting the pivot member only when the transfer member is moving between the datum elevation and the third elevation and the third elevation and the datum elevation.

26. The apparatus of claim 24 further characterized in that the control means includes means for operating the movable presser head moving means to permit the movable presser heads to move from their pressing position to their datum position after a predetermined time interval and upon the return of the movable presser heads to their datum position to actuate the third means for operating the transfer member moving means to move the transfer member from said second elevation through said datum elevation to said third elevation and thence to said datum elevation.

27. The apparatus of claim 24 further characterized in that the control means includes cancel means for operating the first means and the movable presser head moving means to automatically return the buck assembly and movable presser heads to their datum positions regardless of the relative positions of said movable presser heads and the buck assembly.

28. The apparatus of claim 24 further characterized in that each leg member includes a vertically elongated front wing, rear wing and a support member, fourth means mounted on the support member and connected to the upper and lower ends of said wings for mounting said wings on longitudinally opposite sides of the respective support member for movement between a retracted condition and an expanded condition so that the front and rear wings extend more longitudinally remote from the support member than in their retracted condition, and two-way acting piston cylinder means connected to the wing moving means for operating the wing moving means to move said wings between said positions, said piston cylinder means having opposite ends, and that the control means includes pneumatic circuitry for applying air under pressure to said piston cylinder means, and fifth means for operating the pneumatic crcuitry for applying air under pressure to opposite ends of the piston cylinder means during the period the transfer member is moved from its datum to its third elevation with the buck assembly forwardly thereof to move the wings to their expanded condition and to exhaust air under pressure from the one end of said piston cylinder means prior to the movable presser heads moving to the pressing position to further move the wings from their retracted condition.

29. The apparatus of claim 28 further characterized in that there is provided fly head means for acting in cooperation with front wings to press the fly area of the pants when the buck assembly and movable presser heads are in their pressing positions, said fly head means having upwardly inclined pressing surfaces on either transverse side of said longitudinal axis, means mounted on the frame for mounting the fly head means adjacent the stationary presser head and moving the fly head means between a datum position and a rearward pressing position so that the fly head pressing surfaces at least in part form a smooth upward continuation of adjacent stationary presser head surfaces, and that the control means includes means for moving the fly head means from its datum position to its pressing position after the buck assembly has been moved to its pressing position.

30. In pants buck apparatus, a mounting portion having a longitudinal axis, a vertical elongated support member extendable into a pant leg and having an upper portion secured to said mounting portion, a vertically elongated front wing plate having an upper end portion and a lower end portion, first means mounted on said mounting portion and connected to the wing plate upper portion for moving the upper portion between a retracted position and an expanded position extending more longitudinally remote of the support member, second means mounted on said mounting portion for operating the first means to move the upper portion between said positions, third means mounted on the support member for mounting the wing plate lower portion for limited movement as the wing plate upper portion is moved between said positions, and fourth means mounted on the upper portion moving means for movement therewith for selectively clamping a portion of the pants against the front wing upper portion.

31. The apparatus of claim 30 further characterized in that the fourth means includes a bracket mounted on said upper portion moving means, a clamp, and fifth means mounted on said bracket and connected to the clamp for moving the clamp between a position clampingly retaining the adjacent pants portion in engagement with the upper portion and a position remote from said upper portion.

32. The apparatus of claim 31 further characterized in that said fifth means includes a piston cylinder combination, said combination including a cylinder having an upper end portion connected to said bracket, and a piston rod, sixth means for connecting the piston rod to the clamp, a control plate pivotally connected to the piston rod, and means for pivotally connecting the plate to the bracket at a lower elevation than the connection of the cylinder to the bracket so that the plate at least initially moves the sixth means away from the upper portion as the piston rod is retracted.

33. The apparatus of claim 32 further characterized in that there is provided resilient means interconnecting the upper portion moving means and said control plate for resiliently urging said control plate to move the sixth means to move the clamp toward a clamping position when the clamp is adjacent a clamping position and toward the clamp remote position when the clamp is adjacent its remote position.

34. The apparatus of claim 30 further characterized in that there is provided a vertically elongated rear wing having an upper portion and a lower portion, and means mounted on the support member for mounting the rear wing lower portion for movement relative the support member between a rear wing retracted position and a rear wing expanded condition, and that said front wing upper portion moving means includes fifth means for moving the front wing upper portion between its positions, sixth means for moving the rear wing upper portion between a retracted position longitudinally adjacent the front wing in a retracted position, and an expanded position longitudinally remote from the front wing and in a direction generally opposite the movement of the front wing toward its expanded condition, and means mounted on said mounting portion and connected to said fifth and sixth means for moving them in generally longitudinally opposite directions as one of them is moved to move both the front and rear wings to an expanded position at the same time and alternately to a retracted condition.

35. The apparatus of claim 34 further characterized in that said apparatus includes means mounted on the mounting member and connected to the rear wing lower portion moving means for operating the last mentioned moving means to move the rear wing plate lower portion to an expanded condition about the same time the rear wing plate upper portion is moved to an expanded condition.

36. The apparatus of claim 35 further characterized in that there is provided a vertically elongated seat wing, means mounting the seat wing on the rear wing upper portion for movement therewith and relative thereto between an expanded condition at least partially overlapping the rear wing and a retracted condition relative the rear wing plate to overlap the rear wing to a substantially greater extent than in the expanded condition and means mounted on said sixth means for moving the seat wing to its expanded condition and alternately permitting the seat wing to be moved to a retracted condition.

37. In pants buck apparatus for having a pair of pants dressed thereon that have a torso portion and leg portions, a first and a second elongated support member each having an upper portion and a lower portion, said support members being of a size and shape to both extend through the torso portion with one extending into each of the respective leg portions, first means joined to the upper ends of the support members for mountingly retaining the support members in depending and downwardly diverging relationship, second means mounted on said support members for retaining the pants on said support members, stretching the torso and leg portions in girth to a taut condition and retaining said torso and leg portions taut, said second means including a vertically elongated rear wing plate for each support member, each wing plate having a lower portion and an upper portion and being movable between a retracted position extending closely adjacent the respective support members and an expanded condition extending substantially more remote from the respective support members, third means mounted on each support member lower portion for mounting the respective wing plate lower portion for limited movement, a seat wing mounted on the upper portion of each wing plate for movement between a retracted position substantially overlapping the respective wing plate and an expanded condition overlapping the respective wing plate to a substantially lesser extent than in its retracted condition and at least partially longitudinally more closely adjacent the respective support member than in its expanded condition, and fourth means mounted on the second means for mounting and moving the wing plate upper portions, and the seat wings with the wing plates and relative the wing plates, between expanded conditions and retracted conditions, said fourth means including for each wing plate, first operative means mounted on the first means and connected to the respective wing plate upper portion for moving it generally longitudinally between its expanded and retracted conditions, and second operative means joined to the respective first operative means for moving the respective seat wing to its expanded condition independent of the movement of the wing plate to its expanded condition.

38. The apparatus of claim 37 further characterized in that the second operative means includes a piston cylinder combination joined to each first operative means for moving the respective seat wing to its expanded condition.

39. The apparatus of claim 37 further characterized in that the second operative means includes means joined to the first operative means for resiliently urging the respective seat wing to its expanded condition.

40. The apparatus of claim 39 further characterized in that each of the resiliently urging means includes a cylinder sleeve joined to said first operative means, a piston member extending through said sleeve and having a first end portion abuttable against the seat wing to move the seat wing to its expanded condition, an intermediate portion joined to said first end portion, extending through said sleeve and providing a piston surface within the sleeve to have air act thereagainst to move it in a direction away from the wing plate, and a second portion joined to the intermediate portion and extending outwardly of the sleeve in a direction opposite said first end portion, spring means on said sleeve for constantly urging said second portion outwardly of the sleeve, and means for admitting air under pressure to the sleeve to act against said piston surface.

41. The apparatus of claim 37 further characterized in that for each wing plate there is provided a second seat wing on the opposite side of the wing plate from the first mentioned seat wing that is mounted on the wing plate for movement between a seat wing expanded and a seat wing retracted condition by the respective second operative means, and padding of a substantially greater thickness than the respective seat wing secured to each seat wing on the side thereof opposite the wing plate.

42. The apparatus of claim 41 further characterized in that each wing plate is of a width substantially greater than its thickness, and is free of padding.

43. The apparatus of claim 41 further characterized in that each wing plate has a cutout adjacent its upper edge that in a downward direction curves sharply inwardly toward the respective support member, then reversely curves, and then curves more generally outwardly to provide a space into which the waist portion of the pants may extend when the seat wings are at least partially retracted, said seat wings in a fully expanded condition extending more longitudinally remote of the respective support member than any portion of the wing plate in a fully expanded condition and being mounted on the wing plates at an elevation and being of a vertical length to extend vertically above and below said cutout.

44. The apparatus of claim 43 further characterized in that the seat wings for each wing plate are mounted thereon by a pivot member extending through a lower corner portion of the seat wings, and that a pin is joined to the seat wings of each wing to act against the respective wing plate to limit the retracting movement of the seat wings toward the adjacent support member.

45. The apparatus of claim 43 further characterized in that each support member has transversely spaced, vertically elongated edge portions between which the respective wing plate and seat wing are at least partially located in the wing plate retracted condition, and that there is provided bracket means joined to the wing plate upper portions at locations more closely adjacent the support members than the seat wings in a retracted condition relative the wing plates for permitting only limited movement of the wing plates toward and away from one another in directions generally normal to the direction of movement of the wing plates between their expanded and retracted conditions.

46. A garment press having a longitudinal axis and pants back apparatus that includes an upper mounting portion along said longitudinal axis, a first and a second vertically elongated support portion extendable respectively into one leg of a pair of pants and having a lower part, and an upper part joined to said mounting portion, the lower parts of said support portions being substantially transversely spaced and converging in an upward direction toward said axis, a vertically elongated front wing and a rear wing for each support portion, each wing having an upper portion and a lower portion, operable means mounted on the mounting portion for moving the front wing upper portion and the rear wing upper portion in opposite, generally longitudinal directions between a retracted position and an expanded condition that said upper portions extend to positions more longitudinally remote relative the support portions, means mounted on the respective lower part for mounting the wing plate lower portions for movement about transverse axes relative the support member as the upper portions are moved, and first means for connecting said support portions at an elevation that is intermediate said lower parts and the mounting portion, that is more closely adjacent to the mounting portion than the lower parts, that is substantially spaced from the mounting portion, and that is below the upper ends of said wings, said first means being at an elevation adjacent the crotch seam of a pair of pants dressed on said support members.

47. The apparatus of claim 46 further characterized in that each support member comprises vertically elongated transverse inner and outer channels that are joined together and have longitudinal opposite edge portions transversely spaced to permit the respective set of front and rear wings to be at least partially extended therebetween in the wing plate retracted positions, the wing plate moving means mounting the wing plates for movement at least partially into the space between the respective channel edge portions.

48. The apparatus of claim 46 further characterized in that the transverse outer channels have the aforementioned upper parts, that the transverse inner channels have upper parts at a substantially lower elevation than the outer channel upper parts and that the first means includes means for hingedly connecting the lower channel upper parts to permit limited transverse movement thereof.

49. The apparatus of claim 48 further characterized in that the first means includes a crotch bracket having an intermediate, longitudinally extending portion dependingly secured to said hinge means, a second portion joined to one end of said intermediate portion to extend away therefrom at least initially in one longitudinal direction, a third portion joined to the opposite end of said intermediate portion to at least initially extend away therefrom in a direction opposite said one longitudinal direction, said crotch bracket first and second portions being upwardly curved, and a frame, a stationary presser head mounted on said frame, said stationary presser head having a pressing surface on each side of said longitudinal axis that is inclined upwardly and inwardly toward said longitudinal axis, an upper longitudinally extending, generally straight line edge portion, and an upwardly curved edge portion joined to said straight line edge portion, means mounted on the frame and connected to said upper mounting portion for transferring the buck assembly between a first position longitudinally remote from said stationary presser to a pressing position that said support portions extend along transversely opposite stationary presser head pressing surfaces, that the crotch bracket intermediate portion is above and closely adjacent said straight line edge portion and that the crotch bracket second portion is closely adjacent said curved edge portion, a movable presser head on either transverse side of said stationary presser head, means mounted on the frame and connected to the movable presser heads and moving each presser head from a datum position substantially transversely spaced from the adjacent pressing surfaces of the stationary presser head and a pressing position closely adjacent thereto, and control means for operating the transfer means to move the buck assembly from its first position to its second position and thereafter the movable presser heads from their datum positions to their pressing positions in cooperation with the stationary presser head in its pressing position, to press a pair of pants dressed on said buck assembly.

50. The apparatus of claim 49 further characterized in that said stationary presser head has a second upwardly curved edge portion joined to the straight edge opposite the first curved edge portion that extends to a substantially lower elevation than the maximum elevation of said first curved edge portion, and that there is provided a fly head having upwardly and transversely inclined pressing on either side of said longitudinal axis, and means on the frame and connected to the fly head for moving the fly head between a datum position that the fly head is longitudinally forwardly of said straight line edge portion and a pressing position that the fly head abuts against said stationary presser head and the fly head pressing surfaces substantially form an upwardly continuation of a stationary presser head pressing surface on either side of said longitudinal axis and the fly head at least partially overhangs said straight edge portion and extends between said front wings upper portions when the buck assembly is in a pressing position, and that the control means includes means for operating the fly head moving means to move the fly head to its pressing position after the buck assembly has been moved to its pressing position and prior to the movable presser heads having been moved to their pressing positions.

51. The apparatus of claim 50 further characterized in that the transfer means includes a transfer block, second means on the frame for mounting and vertically moving the transfer block between a datum elevation and a second elevation lower than said datum elevation, and between the second elevation and a third elevation higher than the datum elevation, third means pivotally mounted on the transfer block for mounting the upper mounting portion for pivotal movement between a position longitudinally forwardly of the transfer block and a position longitudinally rearwardly thereof, means connected to the frame and to the third means for controlling the movement of the third means as the transfer block is moved through said elevations to translate the buck assembly downwardly as the transfer block is moved between said datum elevation and said second elevation and to pivotally swing the buck assembly between a position forwardly of the transfer block to a position rearwardly thereof as the transfer block moves between the datum elevation and the third elevation.

52. A buck assembly for pressing garments such as pants which have a torso portion and tubular portions joined to said torso portions comprising a first, a second, a third and a fourth elongated channel each having a lower end portion, an upper end portion, and intermediate edge portions between said upper and lower edge portions, first means joined to the upper end portions of the first and second channels for mounting and retaining said first and second channels in downwardly diverging, transverse spaced relationship, means for mounting the third channel on the first channel transversely between the first and second channels, means for mounting the fourth channel on the second channel transversely between the first and second channels, said third and fourth channels being of substantially shorter lengths than the first and second channels, being mounted to diverge from one another in a downward direction, and having their upper end portions at a substantially lower elevation than the first and second channel upper end portions, a first and a second elongated front wing plate, a first and a second elongated rear wing plate, said first front and rear wing plates in a retracted condition extending at least partially between the first and third channels and said second front and rear wing plates in a retracted condition extending at least partially between the second and fourth channels, separate mounting means attached to the lower end portions of the first and third channels and the second and fourth channels respectively for mounting the lower portions of said wing plates for movement, second means mounted on the first means and connected to the upper portions of said wing plates for mounting said wing plates and simultaneously moving the front and rear wing plates in opposite directions between an extended condition and a retracted condition extending at least partially between the adjacent channel members, actuator means mounted on the first means for operating the wing plate upper portion mounting means, and second actuator means connected to the rear wing plate lower portions' mounting means for operating the rear wing plate lower portions between a retracted and an extended condition.

53. The apparatus of claim 52 further characterized in that there is provided means for hingedly connecting the third and fourth channel upper portions to permit limited relative transverse movement thereof.

54. The apparatus of claim 52 further characterized in that there is provided third means for each front wing plate in cooperation thereof to releasably clamp a portion of a pair of pants against the front wing plate, said third means being mounted on said second means.

55. The apparatus of claim 54 further characterized in that each third means includes a mounting bracket mounted on the second means, a clamp movable between a clamping position and a release position, a piston cylinder combination having a cylinder connected to said mounting bracket and a piston rod movable between an extended condition and a retracted condition, and means connected to the second means and to the piston rod for moving the clamp between its clamping position and release position as the piston rod is moved from its extended condition to its retracted condition and resiliently retaining the clamp in its respective position.

References Cited
UNITED STATES PATENTS 2,956,714 10/1960 Rosenthal et al. _____ 223—74
3,144,969 8/1964 Kannegiesser et al. ____ 223—74

JORDAN FRANKLIN, *Primary Examiner.*
G. V. LARKIN, *Assistant Examiner.*